(12) United States Patent
Hu et al.

(10) Patent No.: US 12,099,255 B2
(45) Date of Patent: Sep. 24, 2024

(54) OPTICAL IMAGING LENS ASSEMBLY

(71) Applicant: ZHEJIANG SUNNY OPTICS CO., LTD., Yuyao (CN)

(72) Inventors: Yabin Hu, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 741 days.

(21) Appl. No.: 17/216,798

(22) Filed: Mar. 30, 2021

(65) Prior Publication Data

US 2021/0215907 A1 Jul. 15, 2021

Related U.S. Application Data

(63) Continuation of application No. PCT/CN2020/082984, filed on Apr. 2, 2020.

(30) Foreign Application Priority Data

Jul. 3, 2019 (CN) .......................... 201910610430.8

(51) Int. Cl.
*G02B 9/64* (2006.01)
*G02B 3/04* (2006.01)
*G02B 13/18* (2006.01)

(52) U.S. Cl.
CPC ................ *G02B 9/64* (2013.01); *G02B 3/04* (2013.01); *G02B 13/18* (2013.01)

(58) Field of Classification Search
CPC . G02B 9/64; G02B 3/04; G02B 13/18; G02B 13/0045; G02B 13/06
See application file for complete search history.

(56) References Cited

U.S. PATENT DOCUMENTS 10,365,460 B2 7/2019 Yang
2018/0364454 A1* 12/2018 Yang ........................ G02B 9/64
2018/0364457 A1* 12/2018 Yao ........................... G02B 9/64
(Continued)

FOREIGN PATENT DOCUMENTS

CN 103529539 A 1/2014
CN 105319680 A 2/2016
CN 107153257 A 9/2017
(Continued)

OTHER PUBLICATIONS

Office Action dated Jun. 22, 2022 issued by the Chinese Patent Office in Chinese Application No. 202110902941.4.
(Continued)

*Primary Examiner* — Mustak Choudhury
(74) *Attorney, Agent, or Firm* — Sughrue Mion, PLLC

(57) ABSTRACT

The present disclosure discloses an optical imaging lens assembly including, sequentially from an object side to an image side along an optical axis, a first lens, a second lens, a third lens, a fourth lens, a fifth lens, a sixth lens and a seventh lens. Each of the first lens to the seventh lens has refractive power. The first lens has positive refractive power, and the third lens has negative refractive power. Half of a diagonal length ImgH of an effective pixel area on an imaging plane of the optical imaging lens assembly satisfies: ImgH>5 mm; and a relative F number Fno of the optical imaging lens assembly satisfies Fno<1.6.

20 Claims, 12 Drawing Sheets

(56) References Cited

U.S. PATENT DOCUMENTS

| | | | |
|---|---|---|---|
| 2019/0129147 A1 | 5/2019 | Huh et al. | |
| 2019/0179124 A1 | 6/2019 | Huang | |

FOREIGN PATENT DOCUMENTS

| | | | |
|---|---|---|---|
| CN | 107300751 A | 10/2017 | |
| CN | 107678136 A | 2/2018 | |
| CN | 107976790 A | 5/2018 | |
| CN | 207336905 U | 5/2018 | |
| CN | 108132512 A | 6/2018 | |
| CN | 108132524 A | 6/2018 | |
| CN | 108279471 A | 7/2018 | |
| CN | 109143535 A | 1/2019 | |
| CN | 109613684 A | 4/2019 | |
| CN | 109725404 A | 5/2019 | |
| CN | 209055736 U | 7/2019 | |
| CN | 110471164 A | 11/2019 | |
| JP | 2015-72403 A | 4/2015 | |

OTHER PUBLICATIONS

International Search Report for PCT/CN2020/082984 dated Jun. 29, 2020 (PCT/ISA/210).
Office Action issued Feb. 24, 2022 in Indian Application No. 202117016398.

* cited by examiner

OPTICAL IMAGING LENS ASSEMBLY

CROSS-REFERENCE TO RELATED APPLICATIONS

The present patent application is a continuation of International Application No. PCT/CN2020/082984, filed on Apr. 2, 2020, which claims priority to Chinese Patent Application No. 201910610430.8, filed before the China National Intellectual Property Administration (CNIPA) on Jul. 3, 2019. Both of the aforementioned patent applications are hereby incorporated by reference in their entireties.

TECHNICAL FIELD

The present disclosure relates to an optical imaging lens assembly, and more specifically, relates to an optical imaging lens assembly including seven lenses.

BACKGROUND

With the rapid development of portable electronic devices, such as smart phones, consumers have increasingly higher requirements for camera lens assemblies mounted on the portable electronic devices. Especially for the main camera lens assembly of the smart phones, it is hoped that it may have the characteristics of large image plane, large aperture, and ultra-thin at the same time. Large image plane means higher pixel and imaging resolution. Large aperture represents more effective luminous flux and a higher signal-to-noise ratio during imaging, which is conducive to the image quality of night scenes under dark light. Ultra-thinness may achieve better compatibility with the shape of smart phones for easy portability. Compared with the previous specifications of mobile phone lens assembly, the changes on these main value parameters may greatly improve the imaging capability and competitive advantage of the mobile phone lens assembly.

However, in order to achieve the characteristics of large image plane, large aperture, ultra-thinness, etc., new challenges are presented to the field of lens assembly design. The previous five-piece or six-piece optical system structure is no longer sufficient to meet these challenges, and the seven-piece optical imaging system may gradually become the mainstream.

SUMMARY

The present disclosure provides an optical imaging lens assembly that is applicable to portable electronic products and at least solves or partially solves at least one of the above disadvantages of the prior art.

In one aspect, the present disclosure provides an optical imaging lens assembly including, sequentially from an object side to an image side along an optical axis, a first lens, a second lens, a third lens, a fourth lens, a fifth lens, a sixth lens and a seventh lens. Each of the first to the seventh lenses has refractive power. The first lens may have positive refractive power, and the third lens may have negative refractive power. Half of a diagonal length ImgH of an effective pixel area on an imaging plane of the optical imaging lens assembly may satisfy: ImgH>5 mm.

In one embodiment, a relative F number Fno of the optical imaging lens assembly may satisfy: Fno<1.6.

In one embodiment, a total effective focal length f of the optical imaging lens assembly and an effective focal length f7 of the seventh lens may satisfy: $-1.5<f/f7\leq-1.0$.

In one embodiment, an effective focal length f1 of the first lens and a radius of curvature R1 of an object-side surface of the first lens may satisfy: $1.5<f1/R1<3.5$.

In one embodiment, a radius of curvature R3 of an object-side surface of the second lens and a radius of curvature R4 of an image-side surface of the second lens may satisfy: $0.5<R3/R4<2.5$.

In one embodiment, a radius of curvature R5 of an object-side surface of the third lens and a radius of curvature R6 of an image-side surface of the third lens may satisfy: $1.0<R5/R6<3.5$.

In one embodiment, a radius of curvature R11 of an object-side surface of the sixth lens and a radius of curvature R12 of an image-side surface of the sixth lens may satisfy: $0<R11/R12<1.5$.

In one embodiment, a radius of curvature R13 of an object-side surface of the seventh lens and a radius of curvature R14 of an image-side surface of the seventh lens may satisfy: $-3.5<R13/R14<-2.0$.

In one embodiment, a spaced interval T45 between the fourth lens and the fifth lens along the optical axis and a spaced interval T23 between the second lens and the third lens along the optical axis may satisfy: $0.5<T45/T23<1.5$.

In one embodiment, a center thickness CT1 of the first lens along the optical axis and a center thickness CT2 of the second lens along the optical axis may satisfy: $2.5<CT1/CT2<4.5$.

In one embodiment, a center thickness CT4 of the fourth lens along the optical axis and a center thickness CT3 of the third lens along the optical axis may satisfy: $2.5<CT4/CT3<5.0$.

In one embodiment, an edge thickness ET7 of the seventh lens and a center thickness CT7 of the seventh lens along the optical axis may satisfy: $1.0<ET7/CT7<3.5$.

In one embodiment, SAG71, being an on-axis distance from an intersection of an object-side surface of the seventh lens and the optical axis to a vertex of an effective radius of the object-side surface of the seventh lens, and SAG42, being an on-axis distance from an intersection of an image-side surface of the fourth lens and the optical axis to a vertex of an effective radius of the image-side surface of the fourth lens, may satisfy: $1.5<SAG71/SAG42<2.5$.

In one embodiment, a refractive index n2 of the second lens may satisfy: n2>1.6.

In one embodiment, a refractive index n3 of the third lens may satisfy: n3>1.6.

In one embodiment, a refractive index n6 of the sixth lens may satisfy: n6>1.6.

The present disclosure employs seven lenses, and the above optical imaging lens assembly has at least one beneficial effect, such as ultra-thinness, high image quality, large image plane, and large aperture and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
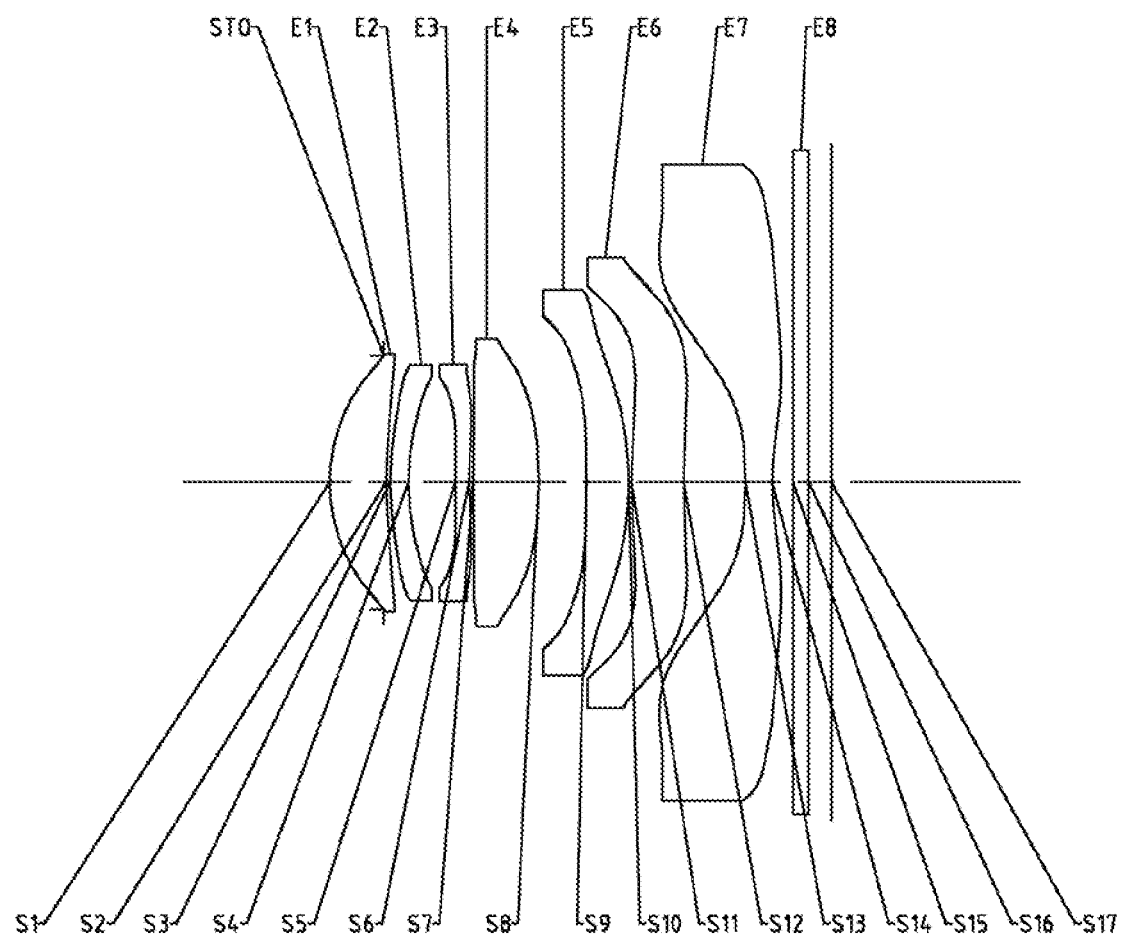
FIG. 1 illustrates a schematic structural view of an optical imaging lens assembly according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region: and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including." "having." "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below:

An optical imaging lens assembly according to an exemplary embodiment of the present disclosure may include, for example, seven lenses having refractive power. The seven lenses are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the first lens may have positive refractive power; the second lens has positive or negative refractive power: the third lens may have negative refractive power: the fourth lens has positive or negative refractive power: the fifth lens has positive or negative refractive power: the sixth lens has positive or negative refractive power: and the seventh lens has positive or negative refractive power.

In an exemplary embodiment, the optical imaging lens assembly according to the present disclosure may satisfy:

ImgH>5 mm, where ImgH is half of a diagonal length of an effective pixel area on an imaging plane of the optical imaging lens assembly. More specifically, ImgH may further satisfy: 5.15 mm≤ImgH≤6.02 mm. In the case of the same pixel size, the larger the effective pixel area of the imaging plane is, the more the number of pixels will be, and the higher the resolution will be.

In an exemplary embodiment, the optical imaging lens assembly according to the present disclosure may satisfy: Fno<1.6, where Fno is a relative F number of the optical imaging lens assembly. More specifically, Fno may further satisfy: 1.50≤Fno≤1.59. Fno less than 1.6 is beneficial to increasing the effective light flux per unit time and improving the signal-to-noise ratio of imaging.

In an exemplary embodiment, the optical imaging lens assembly according to the present disclosure may satisfy: −1.5<f/f7≤−1.0, where f is a total effective focal length of the optical imaging lens assembly, and f7 is an effective focal length of the seventh lens. More specifically, f and f7 may further satisfy: −1.29≤f/f7≤−1.16. By controlling the effective focal length of the seventh lens within a reasonable range, the astigmatic in the tangential direction may be corrected while the seventh lens shares a reasonable refractive power. Optionally, the seventh lens has negative refractive power.

In an exemplary embodiment, the optical imaging lens assembly according to the present disclosure may satisfy: 1.5<f1/R1<3.5, where f1 is an effective focal length of the first lens, and R1 is a radius of curvature of an object-side surface of the first lens. More specifically, f1 and R1 may further satisfy: 1.83≤f1/R1≤3.32. By reasonably controlling the ratio of the focal length of the first lens to the radius of curvature of the object-side surface of the first lens, it is possible to ensure that the vector height of the object-side surface is within the machinable range. At the same time, it is beneficial to correct the on-axis spherical aberration of the lens system. Optionally, the object-side surface of the first lens is convex.

In an exemplary embodiment, the optical imaging lens assembly according to the present disclosure may satisfy: 0.5<R3/R4<2.5, where R3 is a radius of curvature of an object-side surface of the second lens, and R4 is a radius of curvature of an image-side surface of the second lens. More specifically, R3 and R4 may further satisfy: 0.98≤R3/R4≤2.14. By controlling the ratio of the radii of curvature of the object-side surface and the image-side surface of the second lens, the Petzval field curvature of the lens system may be effectively corrected. Optionally, the object-side surface of the second lens is convex, and the image-side surface of the second lens is concave.

In an exemplary embodiment, the optical imaging lens assembly according to the present disclosure may satisfy: 1.0<R5/R6<3.5, where R5 is a radius of curvature of an object-side surface of the third lens, and R6 is a radius of curvature of an image-side surface of the third lens. More specifically, R5 and R6 may further satisfy: 1.09≤R5/R6≤3.10. By reasonably controlling the ratio of the radii of curvature of the object-side surface and the image-side surface of the third lens, the incident angle of the light from the center field-of-view when it reaches the two surfaces is small, thereby reducing the MTF tolerance sensitivity of the center field-of-view. Optionally, the object-side surface of the third lens is convex, and the image-side surface of the third lens is concave.

In an exemplary embodiment, the optical imaging lens assembly according to the present disclosure may satisfy: 0<R11/R12<1.5, where R11 is a radius of curvature of an object-side surface of the sixth lens, and R12 is a radius of curvature of an image-side surface of the sixth lens. More specifically, R11 and R12 may further satisfy: 0.49≤R11/R12≤1.29. By controlling the ratio of the radii of curvature of the object-side surface and the image-side surface of the sixth lens to be within a reasonable range, the position of the ghost image generated by the even reflection of the light incident on the two surfaces at a specific incident angle is moved outside the effective imaging surface, thereby reducing the risk of ghosting. Optionally, the object-side surface of the sixth lens is convex, and the image-side surface of the sixth lens is concave.

In an exemplary embodiment, the optical imaging lens assembly according to the present disclosure may satisfy: −3.5<R13/R14<−2.0, where R13 is a radius of curvature of an object-side surface of the seventh lens, and R14 is a radius of curvature of an image-side surface of the seventh lens. More specifically, R13 and R14 may further satisfy: −3.23≤R13/R14≤−2.09. By reasonably constraining the ratio of the radii of curvature of the object-side surface and the-image side surface of the seventh lens, it is beneficial to correct the astigmatic in the sagittal direction of the lens system. Optionally, the object-side surface of the seventh lens is concave, and the image-side surface of the seventh lens is concave.

In an exemplary embodiment, the optical imaging lens assembly according to the present disclosure may satisfy: 0.5<T45/T23<1.5, where T45 is a spaced interval between the fourth lens and the fifth lens along the optical axis, and T23 is a spaced interval between the second lens and the third lens along the optical axis. More specifically, T45 and T23 may further satisfy: 0.83≤T45/T23≤1.25. It is beneficial to correct the axial chromatic aberration of the lens system by reasonably controlling the on-axis air intervals between the fourth lens and the fifth lens and between the second lens and the third lens while ensuring the overall optical length of the lens system.

In an exemplary embodiment, the optical imaging lens assembly according to the present disclosure may satisfy: 2.5<CT1/CT2<4.5, where CT1 is a center thickness of the first lens along the optical axis, and CT2 is a center thickness of the second lens along the optical axis. More specifically, CT1 and CT2 may further satisfy: 2.85≤CT1/CT2≤4.25. By reasonably controlling the center thicknesses of the first lens and the second lens along the optical axis, it is beneficial to ensure that the two plastic lenses meet the process requirements of the molding. At the same time, it is beneficial to correct the off-axis coma.

In an exemplary embodiment, the optical imaging lens assembly according to the present disclosure may satisfy: 2.5<CT4/CT3<5.0, where CT4 is a center thickness of the fourth lens along the optical axis, and CT3 is a center thickness of the third lens along the optical axis. More specifically, CT4 and CT3 may further satisfy: 2.65≤CT4/CT3≤4.81. On the one hand, by controlling the ratio of the center thicknesses of the third lens and the fourth lens along the optical axis in a reasonable range, the optical length of the system is guaranteed to be ultra-short. On the other hand, it is beneficial to correct the off-axis field-of-view astigmatic in the tangential and sagittal directions of the lens system.

In an exemplary embodiment, the optical imaging lens assembly according to the present disclosure may satisfy: 1.0<ET7/CT7<3.5, where ET7 is an edge thickness of the seventh lens, and CT7 is a center thickness of the seventh lens along the optical axis. ET7 is measured in the direction parallel to the optical axis. More specifically, ET7 and CT7 may further satisfy: 1.21≤ET7/CT7≤3.10. By constraining the ratio of the edge thickness to the center thickness of the seventh lens, the thickness ratio of the lens is controlled within a reasonable range, which is beneficial to correct the distortion of the lens system.

In an exemplary embodiment, the optical imaging lens assembly according to the present disclosure may satisfy: 1.5<SAG71/SAG42<2.5, where SAG71 is an on-axis distance from an intersection of an object-side surface of the seventh lens and the optical axis to a vertex of an effective radius of the object-side surface of the seventh lens, and SAG42 is an on-axis distance from an intersection of an image-side surface of the fourth lens and the optical axis to a vertex of an effective radius of the image-side surface of the fourth lens. More specifically, SAG71 and SAG42 may further satisfy: 1.76≤SAG71/SAG42≤2.05. By reasonably controlling the ratio of SAG71 to SAG42, it is beneficial to reduce the ghost energy generated by the even reflections on the both surfaces, thereby reducing the risk of ghosting.

In an exemplary embodiment, the optical imaging lens assembly according to the present disclosure may satisfy: n2>1.6, n3>1.6 and n6>1.6, where n2 is a refractive index of the second lens, n3 is a refractive index of the third lens, and n6 is a refractive index of the sixth lens. The second lens and the third lens adopt high refractive index materials, which is beneficial to correct the on-axis spherical aberration, thereby improving the image quality of the internal field-of-view. The sixth lens adopts high-refractive index material, which is beneficial to correct off-axis coma and astigmatic, thereby improving the image quality of the external field-of-view.

In an exemplary embodiment, the above optical imaging lens assembly may further include a stop. The stop may be disposed at an appropriate position as required, for example, between the object side and the first lens. Optionally, the above optical imaging lens assembly may further include an optical filter for correcting the color deviation and/or a protective glass for protecting the photosensitive element located on an imaging plane.

The optical imaging lens assembly according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging lens assembly may be effectively reduced, and the workability of the imaging lens assembly may be improved, such that the optical imaging lens assembly is more advantageous for production processing and may be applied to portable electronic products. This present disclosure intends to provide a seven-piece optical imaging lens assembly with a large image plane, a large aperture, and an ultra-thin thickness, to better meet the application requirements of smart phones for the main camera. Large image plane means higher pixel and imaging resolution. Large aperture represents more effective luminous flux and a higher signal-to-noise ratio during imaging, which is conducive to the image quality of night scenes under dark light. Ultra-thinness may achieve better compatibility with the shape of the smart phones for easy portability.

In the embodiments of the present disclosure, at least one of the surfaces of the lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking seven lenses as an example, the optical imaging lens assembly is not limited to include seven lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2C. FIG. 1 shows a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

Table 1 is a table illustrating basic parameters of the optical imaging lens assembly of example 1, wherein the units for the radius of curvature, the thickness and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −0.9024 | | | | |
| S1 | Aspheric | 2.9673 | 0.9440 | 1.55 | 55.8 | 9.85 | −0.0479 |
| S2 | Aspheric | 5.8704 | 0.0688 | | | | −36.7994 |
| S3 | Aspheric | 4.0935 | 0.3057 | 1.67 | 20.4 | 125.63 | −15.8550 |
| S4 | Aspheric | 4.1750 | 0.7888 | | | | −2.5903 |
| S5 | Aspheric | 22.0742 | 0.2289 | 1.67 | 20.4 | −15.84 | 93.4430 |
| S6 | Aspheric | 7.1186 | 0.0676 | | | | −26.9803 |
| S7 | Aspheric | 14.1756 | 1.0999 | 1.55 | 55.8 | 10.08 | 2.1219 |
| S8 | Aspheric | −8.7577 | 0.8160 | | | | −37.1156 |
| S9 | Aspheric | −37.0337 | 0.7066 | 1.55 | 55.8 | 10.74 | −99.0000 |
| S10 | Aspheric | −5.0975 | 0.0493 | | | | −8.4708 |
| S11 | Aspheric | 15.7659 | 0.8733 | 1.62 | 25.9 | −335.13 | 4.5878 |
| S12 | Aspheric | 14.3435 | 1.0371 | | | | −73.3509 |
| S13 | Aspheric | −8.6501 | 0.4500 | 1.54 | 55.8 | −5.14 | 1.1167 |
| S14 | Aspheric | 4.1297 | 0.3485 | | | | −0.7092 |
| S15 | Spherical | Infinite | 0.2652 | 1.52 | 64.2 | | |
| S16 | Spherical | Infinite | 0.3802 | | | | |
| S17 | Spherical | Infinite | | | | | |

In this example, a total effective focal length f of the optical imaging lens assembly satisfies f=6.55 mm, a distance TTL along the optical axis from the object-side surface S1 of the first lens E1 to the imaging plane S17 satisfies TTL=8.43 mm, half of a diagonal length ImgH of an effective pixel area on the imaging plane S17 satisfies ImgH=5.65 mm, half of a maximum field-of-view Semi-FOV of the optical imaging lens assembly satisfies Semi-FOV=40.7°, and a relative F number Fno of the optical imaging lens assembly satisfies Fno=1.53.

In example 1, the object-side surface and the image-side surface of any one of the first lens E1 to the seventh lens E7 of the optical imaging lens assembly are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 of the optical imaging lens assembly according to example 1.

TABLE 2

| Surface number | A4 | A6 | A8 | A10 | A12 | A14 | A16 | A18 | A20 |
|---|---|---|---|---|---|---|---|---|---|
| S1 | 2.9123E−02 | −5.3410E−03 | −5.9228E−03 | −2.9219E−03 | −1.1757E−03 | −3.6662E−04 | −8.6040E−05 | −1.1173E−05 | −3.2463E−07 |
| S2 | −7.9581E−02 | 2.5163E−02 | −8.0884E−03 | 1.7288E−03 | −4.5310E−04 | 7.0156E−05 | −2.3920E−06 | −4.0791E−06 | 9.4489E−07 |
| S3 | −3.8019E−02 | 4.4335E−02 | −4.6594E−03 | 3.1277E−03 | 1.4789E−04 | 1.2167E−04 | 6.9217E−05 | −5.7659E−06 | 8.3658E−06 |
| S4 | 6.1596E−03 | 1.4198E−02 | −1.5394E−03 | 1.6744E−04 | 5.4299E−05 | −4.0163E−05 | 1.0577E−05 | −6.0335E−06 | 9.9013E−07 |
| S5 | −2.5754E−01 | −3.9317E−03 | −8.6699E−04 | 7.3914E−04 | −1.4132E−04 | 4.9660E−05 | −2.7379E−05 | −1.3794E−07 | 1.4973E−06 |
| S6 | −2.8035E−01 | 3.2048E−02 | 6.3857E−03 | 3.5848E−03 | −5.7715E−04 | 1.9263E−04 | −4.5011E−05 | 3.5350E−05 | 8.4038E−06 |
| S7 | −1.8823E−01 | 6.2762E−02 | 5.2682E−04 | 2.1855E−03 | −1.5211E−03 | 2.1573E−04 | −1.9303E−04 | 2.8309E−05 | 9.0191E−06 |
| S8 | −5.6508E−01 | 5.7283E−02 | 1.4148E−02 | 1.5190E−02 | 7.7438E−03 | 2.5202E−03 | 6.1319E−04 | 1.7949E−04 | 2.6447E−05 |
| S9 | −8.9015E−01 | −1.1415E−02 | −2.1879E−03 | 2.4322E−02 | 1.8577E−02 | 1.6623E−03 | −1.0393E−03 | 1.6410E−04 | −4.4151E−04 |
| S10 | −1.0659E−01 | 6.3653E−02 | −4.2527E−02 | −3.0663E−02 | 7.8164E−03 | −6.2623E−03 | 5.2135E−04 | −8.6453E−04 | −8.5689E−04 |
| S11 | −1.5732E+00 | −1.0541E−01 | 8.3882E−02 | 1.7537E−03 | 5.5356E−03 | −3.3405E−03 | 7.8158E−03 | −6.7672E−04 | −4.8349E−04 |
| S12 | −1.5932E+00 | 9.5261E−02 | 1.5328E−01 | 2.4497E−02 | 8.1838E−03 | −6.7710E−03 | −8.2386E−04 | −2.9082E−03 | −1.3661E−03 |
| S13 | −2.7338E−01 | 9.9763E−01 | −5.0691E−01 | 1.5113E−01 | −2.1364E−02 | 1.5291E−02 | 4.0115E−03 | 4.0415E−03 | 4.3342E−03 |
| S14 | −5.1204E+00 | 9.7795E−01 | −4.4378E−01 | 1.3167E−01 | −7.5395E−02 | 2.7765E−03 | −8.1373E−03 | 3.8754E−03 | 4.6268E−04 |

Figure 2A:
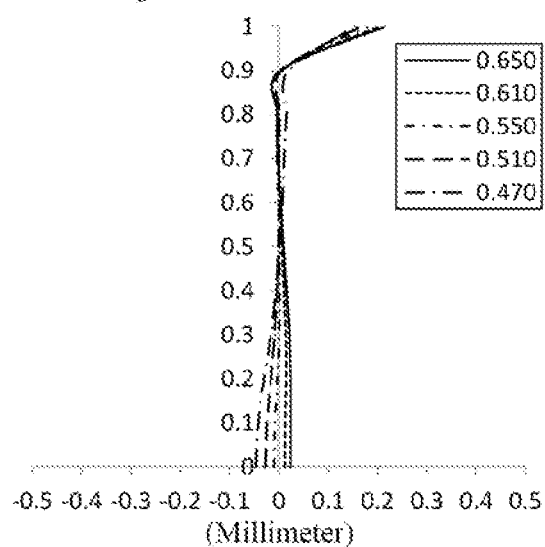
FIGS. 2A to 2C illustrate longitudinal aberration curves, astigmatic curves, and a distortion curve of the optical imaging lens assembly of the example 1, respectively.
Figure 2B:
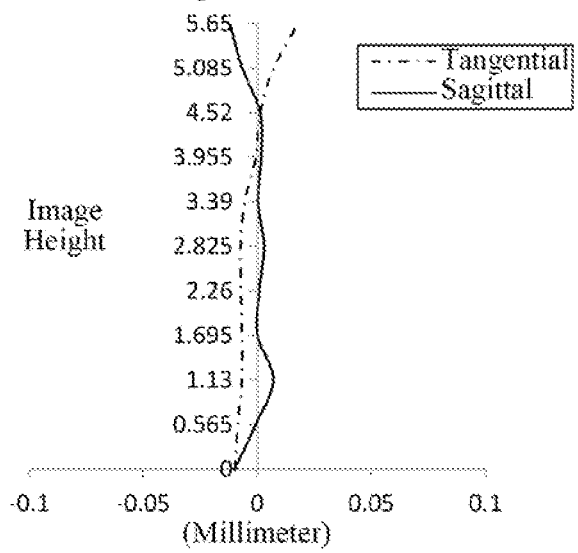
Figure 2C:
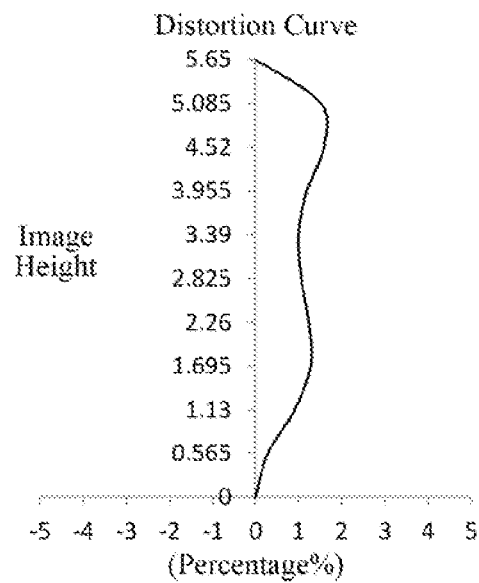

FIG. 2A illustrates longitudinal aberration curves of the optical imaging lens assembly according to example 1, representing the difference in the position of the image formed by light of different wavelengths passing through the lens assembly. FIG. 2B illustrates astigmatic curves of the optical imaging lens assembly according to example 1, representing the curvatures of a tangential plane and the curvatures of a sagittal plane. FIG. 2C illustrates a distortion curve of the optical imaging lens assembly according to example 1, representing the amounts of distortion corresponding to different image heights. It can be seen from FIG. 2A to FIG. 2C that the optical imaging lens assembly provided in example 1 may achieve good image quality.

Example 2

Figure 3:
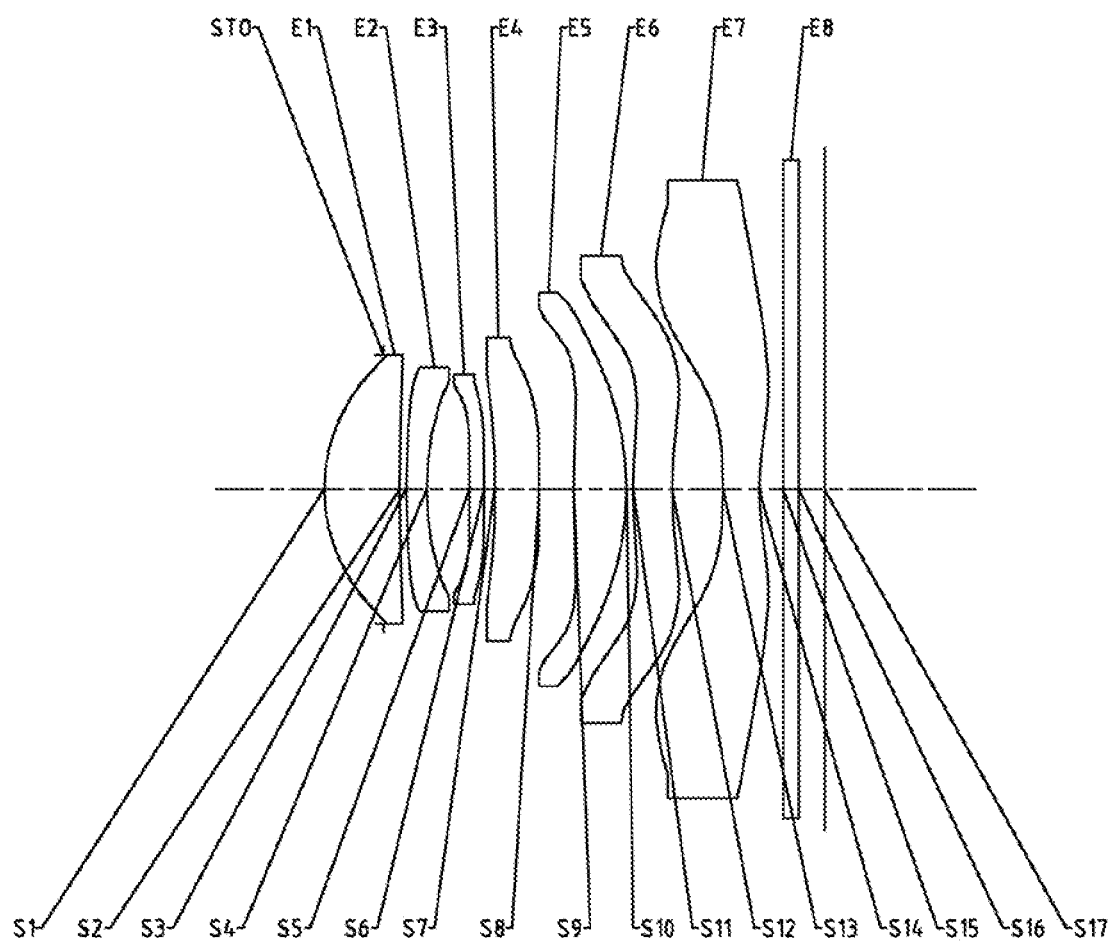
FIG. 3 illustrates a schematic structural view of an optical imaging lens assembly according to example 2 of the present disclosure.

An optical imaging lens assembly according to example 2 of the present disclosure is described below with reference to FIG. 3 to FIG. 4C. In this example and the following examples, for the purpose of brevity, the description of parts similar to those in example 1 will be omitted. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has positive refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.71 mm, a distance TTL along the optical axis from the object-side surface S1 of the first lens E1 to the imaging plane S17 satisfies TTL=8.46 mm, half of a diagonal length ImgH of an effective pixel area on the imaging plane S17 satisfies ImgH=5.75 mm, half of a maximum field-of-view Semi-FOV of the optical imaging lens assembly satisfies Semi-FOV=40.0°, and a relative F number Fno of the optical imaging lens assembly satisfies Fno=1.50.

Table 3 is a table illustrating basic parameters of the optical imaging lens assembly of example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −1.0028 | | | | |
| S1 | Aspheric | 2.9130 | 1.2714 | 1.55 | 55.8 | 6.26 | −0.0589 |
| S2 | Aspheric | 16.6848 | 0.1118 | | | | −19.5304 |
| S3 | Aspheric | 8.5625 | 0.3482 | 1.67 | 20.4 | 6.26 | −23.9712 |
| S4 | Aspheric | 4.5435 | 0.7205 | | | | −3.2114 |
| S5 | Aspheric | 23.1874 | 0.2474 | 1.67 | 20.4 | −415.75 | 89.3958 |
| S6 | Aspheric | 21.3079 | 0.1784 | | | | −19.0651 |
| S7 | Aspheric | 246.1504 | 0.7529 | 1.55 | 55.8 | −1929.06 | 27.4267 |
| S8 | Aspheric | 199.3224 | 0.5965 | | | | −99.0000 |
| S9 | Aspheric | 17.6347 | 0.8897 | 1.55 | 55.8 | 6.98 | −94.8182 |
| S10 | Aspheric | −4.7744 | 0.1141 | | | | −6.6547 |
| S11 | Aspheric | 10.4095 | 0.6587 | 1.62 | 25.9 | −74.13 | −6.2896 |
| S12 | Aspheric | 8.2821 | 0.8591 | | | | −54.3724 |
| S13 | Aspheric | −12.0733 | 0.6084 | 1.54 | 55.8 | −5.51 | 2.0557 |
| S14 | Aspheric | 3.9883 | 0.4051 | | | | −0.7074 |
| S15 | Spherical | Infinite | 0.2652 | 1.52 | 64.2 | | |
| S16 | Spherical | Infinite | 0.4374 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 2.2432E−02 | −3.2533E−03 | −3.9891E−03 | −1.8507E−03 | −7.1502E−04 | −1.9012E−04 | −3.9401E−05 | 6.8435E−06 | 3.5829E−06 |
| S2 | −7.4422E−02 | 1.7828E−02 | −9.2369E−03 | 2.2518E−03 | −6.8662E−04 | 2.1481E−04 | −4.5962E−05 | 1.0447E−05 | −3.4219E−06 |
| S3 | −4.9148E−02 | 4.3318E−02 | −6.8173E−03 | 4.0614E−03 | −4.4653E−04 | 2.6602E−04 | −9.4719E−06 | 4.7795E−06 | 1.1074E−06 |
| S4 | 2.6394E−03 | 1.6899E−02 | −2.6902E−03 | 8.4184E−04 | −1.0227E−04 | 2.1214E−05 | 3.2884E−06 | −8.0052E−06 | 5.7619E−07 |
| S5 | −2.5244E−01 | −9.0743E−03 | −1.2066E−03 | 1.1483E−03 | 2.9957E−05 | 3.0187E−05 | −4.1393E−05 | 4.1430E−06 | −2.3629E−06 |
| S6 | −2.9829E−01 | 3.0440E−02 | 6.8843E−03 | 5.4852E−03 | −1.0865E−04 | −1.9191E−04 | −3.9245E−05 | 6.8651E−05 | 1.0673E−05 |
| S7 | −2.1350E−01 | 6.9380E−02 | −5.6632E−03 | 3.5924E−03 | −2.9073E−03 | −6.5047E−04 | 2.2511E−04 | 2.6573E−06 | −9.0430E−05 |
| S8 | −5.8419E−01 | 6.7786E−02 | 1.6224E−02 | 1.1668E−02 | 1.1881E−02 | −1.1565E−04 | −1.0037E−03 | −3.2052E−04 | −1.0621E−04 |
| S9 | −7.1916E−01 | −7.9777E−02 | 3.6896E−02 | 2.4855E−02 | 7.6688E−03 | −3.2465E−05 | −2.0991E−03 | −7.5699E−04 | −3.5365E−04 |
| S10 | −3.4373E−01 | 9.5752E−03 | −1.7150E−02 | −2.4840E−02 | 2.6937E−03 | 1.2156E−03 | 1.3392E−03 | −1.1546E−03 | −1.9988E−04 |
| S11 | −1.5774E+00 | 1.8313E−01 | 8.3737E−02 | −3.1009E−02 | 3.1735E−05 | −4.1394E−03 | 5.2108E−03 | −1.2638E−03 | −6.9890E−04 |
| S12 | −1.5163E+00 | 1.5730E−01 | 1.3107E−01 | −3.7979E−02 | 1.8186E−02 | −1.0302E−02 | 3.5051E−03 | −2.9627E−03 | 4.9743E−04 |

TABLE 4-continued

| Surface number | A4 | A6 | A8 | A10 | A12 | A14 | A16 | A18 | A20 |
|---|---|---|---|---|---|---|---|---|---|
| S13 | −2.9899E−01 | 8.8881E−01 | −4.5806E−01 | 1.6309E−01 | −3.6967E−02 | −6.4329E−03 | 1.0490E−02 | −5.5170E−03 | 9.2765E−04 |
| S14 | −5.2156E+00 | 1.1242E+00 | −3.8399E−01 | 1.3493E−01 | −5.5250E−02 | 5.2632E−03 | 8.0068E−04 | 5.3479E−04 | −6.2229E−04 |

Figure 4A:
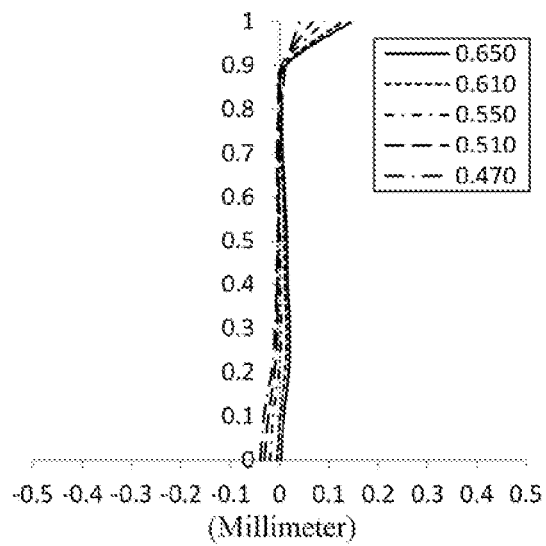
FIGS. 4A to 4C illustrate longitudinal aberration curves, astigmatic curves, and a distortion curve of the optical imaging lens assembly of the example 2, respectively.
Figure 4B:
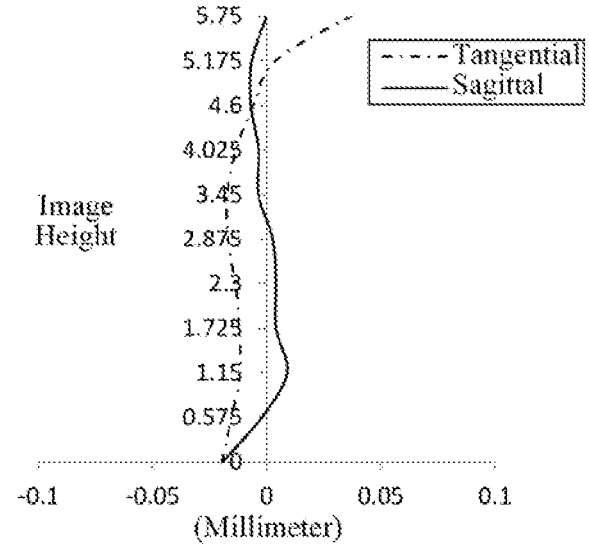
Figure 4C:
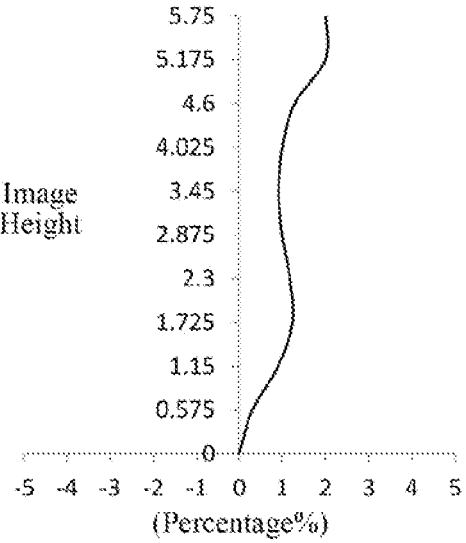

FIG. 4A illustrates longitudinal aberration curves of the optical imaging lens assembly according to example 2, representing the difference in the position of the image formed by light of different wavelengths passing through the lens assembly. FIG. 4B illustrates astigmatic curves of the optical imaging lens assembly according to example 2, representing the curvatures of a tangential plane and the curvatures of a sagittal plane. FIG. 4C illustrates a distortion curve of the optical imaging lens assembly according to example 2, representing the amounts of distortion corresponding to different image heights. It can be seen from FIG. 4A to FIG. 4C that the optical imaging lens assembly provided in example 2 may achieve good image quality.

Example 3

Figure 5:
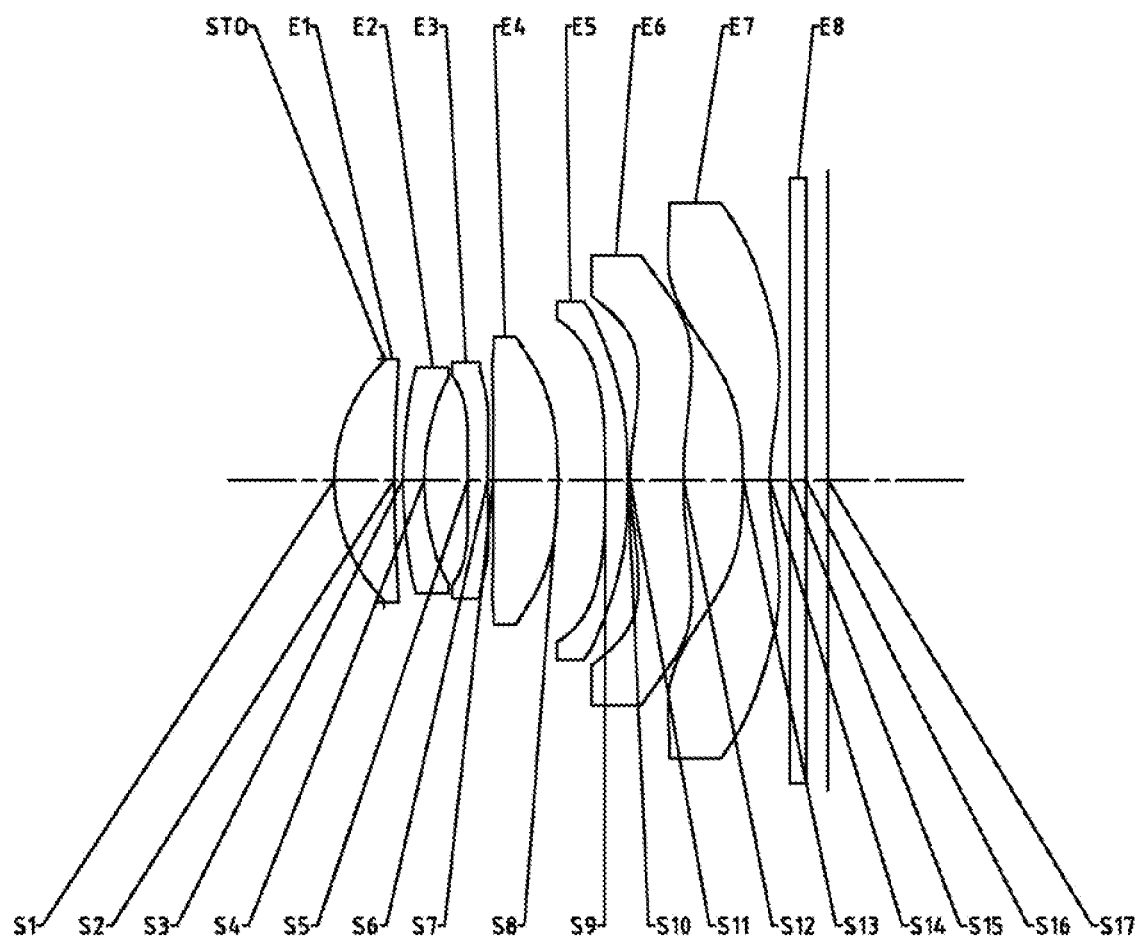
FIG. 5 illustrates a schematic structural view of an optical imaging lens assembly according to example 3 of the present disclosure.

An optical imaging lens assembly according to example 3 of the present disclosure is described below with reference to FIG. 5 to FIG. 6C. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is concave, and an image-side surface S10 thereof is convex. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.40 mm, a distance TTL along the optical axis from the object-side surface S1 of the first lens E1 to the imaging plane S17 satisfies TTL=8.14 mm, half of a diagonal length ImgH of an effective pixel area on the imaging plane S17 satisfies ImgH=5.15 mm, half of a maximum field-of-view Semi-FOV of the optical imaging lens assembly satisfies Semi-FOV=38.8°, and a relative F number Fno of the optical imaging lens assembly satisfies Fno=1.59.

Table 5 is a table illustrating basic parameters of the optical imaging lens assembly of example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −0.8102 | | | | |
| S1 | Aspheric | 2.9078 | 0.9865 | 1.55 | 55.8 | 6.28 | −0.0442 |
| S2 | Aspheric | 16.7635 | 0.1417 | | | | −1.4460 |
| S3 | Aspheric | 5.9684 | 0.3466 | 1.67 | 20.4 | −15.04 | −14.5700 |
| S4 | Aspheric | 3.6558 | 0.7266 | | | | −2.8587 |
| S5 | Aspheric | 23.8924 | 0.3257 | 1.67 | 20.4 | −22.47 | 85.9966 |
| S6 | Aspheric | 9.1639 | 0.0883 | | | | −68.9816 |
| S7 | Aspheric | 16.1141 | 1.0758 | 1.55 | 55.8 | 10.13 | −5.3522 |
| S8 | Aspheric | −8.2295 | 0.7886 | | | | −34.1853 |
| S9 | Aspheric | −17.1894 | 0.3669 | 1.55 | 55.8 | −537.45 | 37.8458 |
| S10 | Aspheric | −18.3962 | 0.0340 | | | | 25.0889 |
| S11 | Aspheric | 4.3732 | 0.8818 | 1.62 | 25.9 | 12.88 | −16.1582 |
| S12 | Aspheric | 8.9174 | 0.9845 | | | | −20.2269 |
| S13 | Aspheric | −10.9506 | 0.4439 | 1.54 | 55.8 | −5.50 | 1.5657 |
| S14 | Aspheric | 4.1059 | 0.3278 | | | | −0.8899 |
| S15 | Spherical | Infinite | 0.2652 | 1.52 | 64.2 | | |
| S16 | Spherical | Infinite | 0.3601 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 2.5509E−02 | −1.9319E−03 | −3.7494E−03 | −2.0371E−03 | −8.3420E−04 | −2.9125E−04 | −7.6312E−05 | −1.2822E−05 | 4.8618E−07 |
| S2 | −6.7007E−02 | 1.7389E−02 | −9.0570E−03 | 1.6734E−03 | −9.8280E−04 | 1.6902E−04 | −6.0320E−05 | 3.3156E−05 | 3.6131E−06 |
| S3 | −3.8628E−02 | 3.9993E−02 | −5.4105E−03 | 3.3826E−03 | −4.9488E−04 | 1.4542E−04 | −4.5149E−05 | −7.4179E−06 | −2.4194E−07 |
| S4 | 4.5189E−03 | 1.7492E−02 | −2.2340E−03 | 8.1784E−04 | −4.9097E−05 | 2.3217E−05 | 7.8492E−06 | −2.5208E−06 | 3.5517E−07 |
| S5 | −2.5590E−01 | −4.5476E−03 | −9.3650E−04 | 9.1740E−04 | 1.4064E−05 | 4.0741E−05 | −5.6395E−06 | −2.5642E−06 | 9.4334E−07 |
| S6 | −3.0466E−01 | 3.0926E−02 | 4.7392E−03 | 3.8708E−03 | −1.3685E−04 | 5.1384E−05 | 2.3339E−06 | 1.2734E−05 | 1.4196E−05 |
| S7 | −2.0760E−01 | 6.9201E−02 | −5.4881E−03 | 2.8930E−03 | −1.2679E−03 | 1.7074E−04 | 1.9382E−05 | −2.8890E−05 | 1.6676E−06 |
| S8 | −5.6253E−01 | 6.2471E−02 | 1.1586E−02 | 1.1747E−02 | 4.0631E−03 | 5.5159E−04 | −1.8574E−04 | −1.3170E−04 | −4.4191E−05 |
| S9 | −7.6768E−01 | −9.9990E−02 | 2.9543E−02 | 2.6434E−02 | 1.8806E−02 | 2.8729E−03 | 2.2737E−04 | −1.6556E−03 | −7.0259E−04 |
| S10 | −5.4332E−01 | 1.0256E−01 | −6.2676E−02 | −8.2153E−03 | −1.3428E−02 | −2.1536E−03 | −6.6430E−04 | −1.9909E−03 | −7.9610E−04 |
| S11 | −1.9496E+00 | −5.6112E−03 | 7.8416E−02 | 1.9677E−02 | −1.0640E−02 | −3.1365E−03 | 4.5877E−03 | 8.5961E−04 | 2.5582E−04 |
| S12 | −1.5206E+00 | 7.2048E−02 | 1.5234E−01 | −1.0747E−02 | 1.6193E−02 | −2.3875E−03 | 7.2641E−03 | −6.4677E−04 | 7.3136E−04 |
| S13 | −3.8001E−01 | 9.1800E−01 | 4.8893E−01 | 1.5405E−01 | −2.3856E−02 | −1.1523E−02 | 1.0524E−02 | 8.6928E−04 | −2.8903E−04 |
| S14 | −5.6445E+00 | 1.0283E+00 | −3.9525E−01 | 1.0430E−01 | −4.9484E−02 | −8.4515E−03 | −5.5303E−03 | 4.8629E−03 | 1.0815E−04 |

Figure 6A:
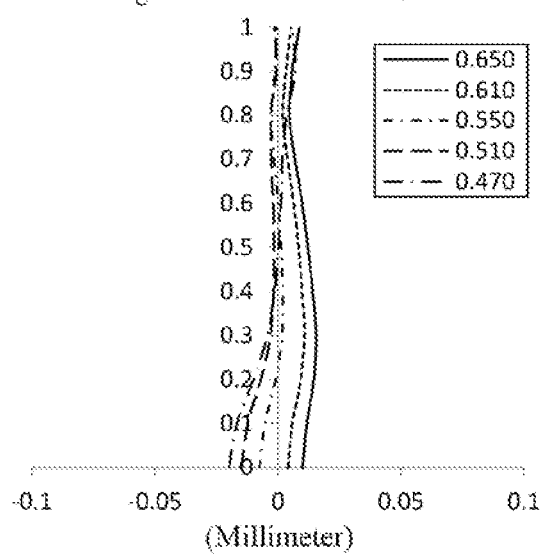
FIGS. 6A to 6C illustrate longitudinal aberration curves, astigmatic curves, and a distortion curve of the optical imaging lens assembly of the example 3, respectively.
Figure 6B:
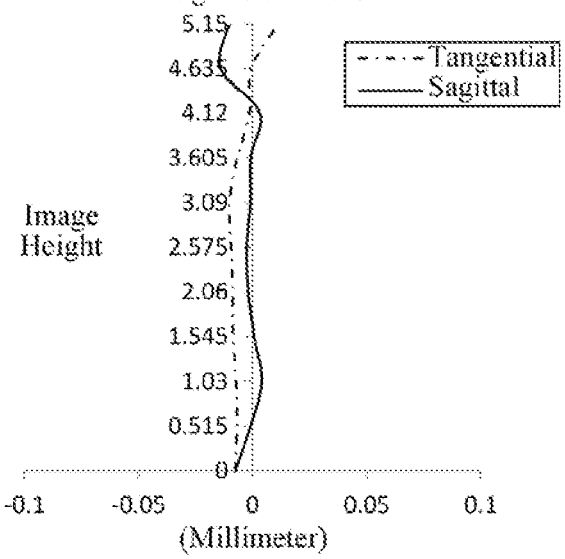
Figure 6C:
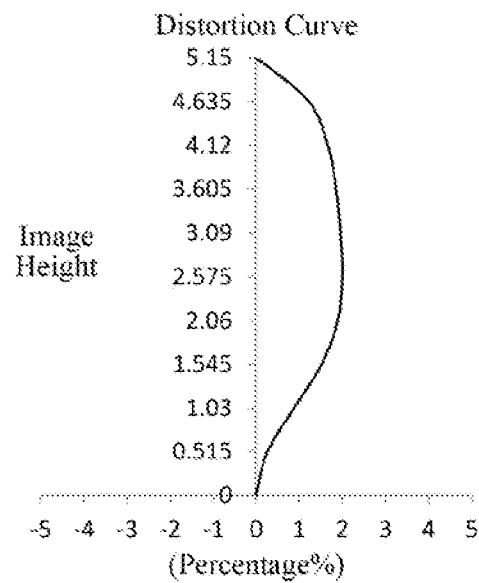

FIG. 6A illustrates longitudinal aberration curves of the optical imaging lens assembly according to example 3, representing the difference in the position of the image formed by light of different wavelengths passing through the lens assembly. FIG. 6B illustrates astigmatic curves of the optical imaging lens assembly according to example 3, representing the curvatures of a tangential plane and the curvatures of a sagittal plane. FIG. 6C illustrates a distortion curve of the optical imaging lens assembly according to example 3, representing the amounts of distortion corresponding to different image heights. It can be seen from FIG. 6A to FIG. 6C that the optical imaging lens assembly provided in example 3 may achieve good image quality.

Example 4

Figure 7:
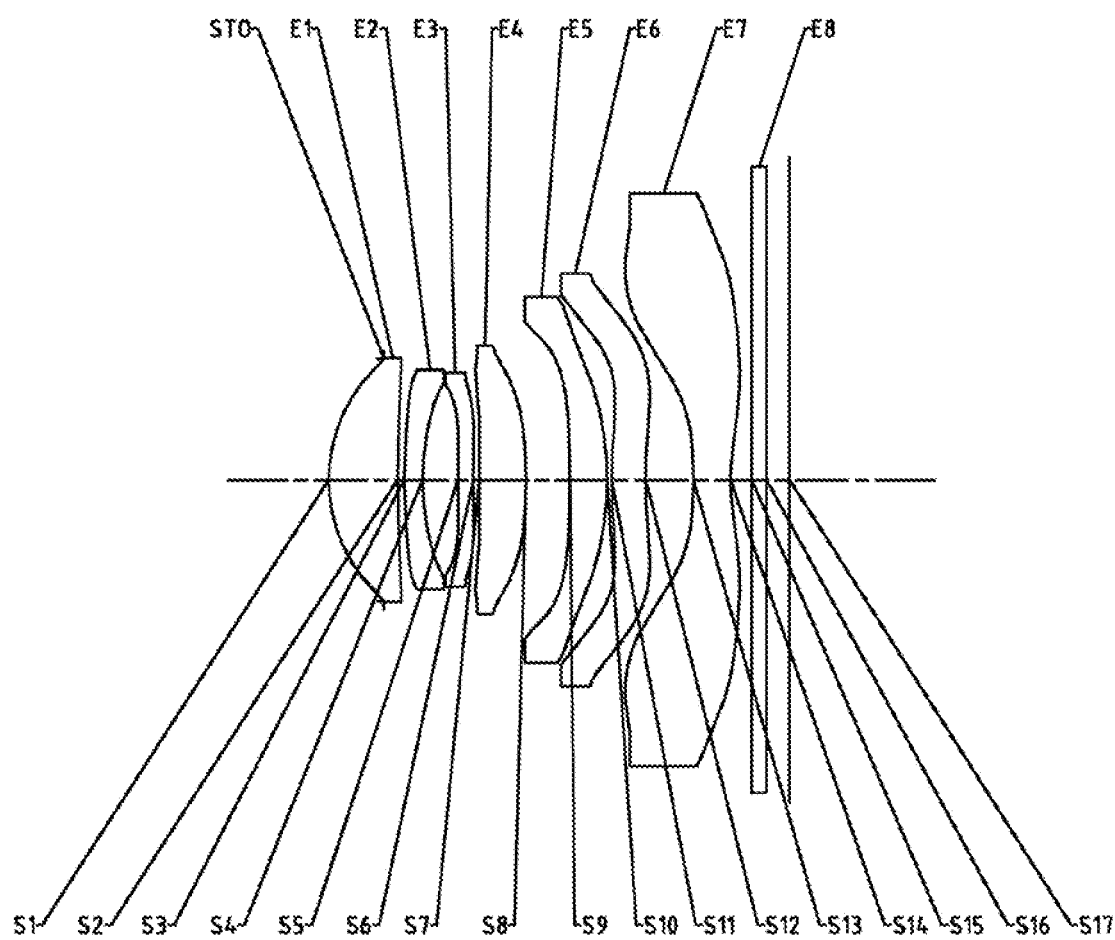
FIG. 7 illustrates a schematic structural view of an optical imaging lens assembly according to example 4 of the present disclosure.

An optical imaging lens assembly according to example 4 of the present disclosure is described below with reference to FIG. 7 to FIG. 8C. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has positive refractive power, an object-side surface S9 thereof is concave, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.30 mm, a distance TTL along the optical axis from the object-side surface S1 of the first lens E1 to the imaging plane S17 satisfies TTL=7.76 mm, half of a diagonal length ImgH of an effective pixel area on the imaging plane S17 satisfies ImgH=5.39 mm, half of a maximum field-of-view Semi-FOV of the optical imaging lens assembly satisfies Semi-FOV=40.0°, and a relative F number Fno of the optical imaging lens assembly satisfies Fno=1.57.

Table 7 is a table illustrating basic parameters of the optical imaging lens assembly of example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −0.9261 | | | | |
| S1 | Aspheric | 2.6799 | 1.1552 | 1.55 | 55.8 | 5.93 | −0.0717 |
| S2 | Aspheric | 13.1687 | 0.1124 | | | | −24.2334 |
| S3 | Aspheric | 7.3099 | 0.3090 | 1.67 | 20.4 | −14.48 | −17.9274 |
| S4 | Aspheric | 4.0918 | 0.5983 | | | | −17.9274 |
| S5 | Aspheric | 19.5525 | 0.2549 | 1.67 | 20.4 | −30.65 | 98.5700 |
| S6 | Aspheric | 9.9450 | 0.1011 | | | | −77.5109 |
| S7 | Aspheric | 20.2230 | 0.7827 | 1.55 | 55.8 | 12.86 | −39.8208 |
| S8 | Aspheric | −10.6137 | 0.7480 | | | | −62.5254 |
| S9 | Aspheric | −25.4186 | 0.6320 | 1.55 | 55.8 | 10.12 | 23.4165 |

TABLE 7-continued

| Surface number | Surface type | Radius of curvature | Thickness/ Distance | Material Refractive index | Abbe number | Focal length | Conic coefficient |
|---|---|---|---|---|---|---|---|
| S10 | Aspheric | −4.5792 | 0.0720 | | | | −8.0664 |
| S11 | Aspheric | 9.0669 | 0.5739 | 1.62 | 25.9 | −207.29 | −11.4971 |
| S12 | Aspheric | 8.2644 | 0.8019 | | | | −98.9280 |
| S13 | Aspheric | −9.6932 | 0.6236 | 1.54 | 55.8 | −4.87 | 1.8557 |
| S14 | Aspheric | 3.6593 | 0.3609 | | | | −0.7834 |
| S15 | Spherical | Infinite | 0.2440 | 1.52 | 64.2 | | |
| S16 | Spherical | Infinite | 0.3902 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 1.6463E−02 | −2.8013E−03 | −3.1760E−03 | −1.3594E−03 | −4.9147E−04 | −1.0804E−04 | −2.6008E−05 | 8.7504E−06 | −2.1060E−06 |
| S2 | −7.0183E−02 | 1.7157E−02 | −7.7556E−03 | 1.9999E−03 | −5.8047E−04 | 1.4544E−04 | −3.4129E−05 | 8.0664E−06 | 4.3780E−06 |
| S3 | −4.0228E−02 | 4.0083E−02 | −5.9142E−03 | 3.7068E−03 | −3.9957E−04 | 1.8820E−04 | 2.1796E−06 | −9.0299E−07 | 6.6875E−06 |
| S4 | −4.0228E−02 | 4.0083E−02 | −5.9142E−03 | 3.7068E−03 | −3.9957E−04 | 1.8820E−04 | 2.1796E−06 | −9.0299E−07 | 6.6875E−06 |
| S5 | −2.3322E−01 | −5.4350E−03 | −1.5657E−03 | 9.7329E−04 | 9.6376E−05 | 1.1360E−05 | −1.2253E−05 | −8.1689E−06 | 1.3446E−06 |
| S6 | −2.7950E−01 | 3.0047E−02 | 4.7935E−03 | 4.3890E−03 | −2.4829E−05 | −2.4490E−04 | −3.5778E−05 | 3.3671E−05 | 2.0978E−05 |
| S7 | −2.0913E−01 | 6.8318E−02 | −3.3701E−03 | 1.8109E−03 | −1.5471E−03 | −1.3178E−04 | 3.2977E−04 | −1.4783E−06 | −6.6247E−05 |
| S8 | −4.8208E−01 | 6.2937E−02 | 2.0681E−02 | 1.0946E−02 | 1.6356E−03 | −1.5977E−03 | −1.2519E−03 | −4.4643E−04 | −1.2742E−04 |
| S9 | −6.4351E−01 | −5.7052E−02 | 3.7119E−02 | 2.1618E−02 | 1.1325E−02 | 5.5359E−04 | −1.9684E−03 | −8.5100E−04 | −3.5543E−04 |
| S10 | −1.8205E−01 | 5.0440E−02 | −1.3008E−02 | −3.0771E−02 | 5.2558E−03 | −1.7183E−03 | 7.3340E−04 | −9.0510E−04 | 3.5531E−04 |
| S11 | −1.5498E+00 | 1.3851E−01 | 7.8967E−02 | −3.0285E−02 | −5.2917E−03 | −2.0290E−03 | 5.1885E−03 | −2.0726E−03 | 4.6952E−04 |
| S12 | −1.4703E+00 | 1.5386E−01 | 1.0288E−01 | −2.9382E−02 | 1.6924E−02 | 1.5570E−03 | 5.2395E−03 | −2.4208E−03 | 1.0824E−04 |
| S13 | −2.7427E−01 | 8.3628E−01 | −4.3362E−01 | 1.4685E−01 | −2.8124E−02 | −7.1801E−03 | 5.7946E−03 | −1.7678E−03 | 9.4806E−05 |
| S14 | −4.9631E+00 | 9.4988E−01 | −3.0480E−01 | 1.3373E−01 | −6.2497E−02 | 5.3336E−03 | −1.8207E−03 | 3.3673E−03 | −1.5665E−03 |

Figure 8A:
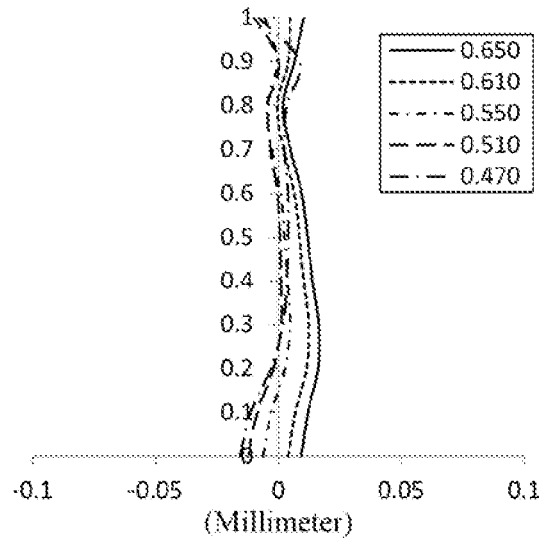
FIGS. 8A to 8C illustrate longitudinal aberration curves, astigmatic curves, and a distortion curve of the optical imaging lens assembly of the example 4, respectively.
Figure 8B:
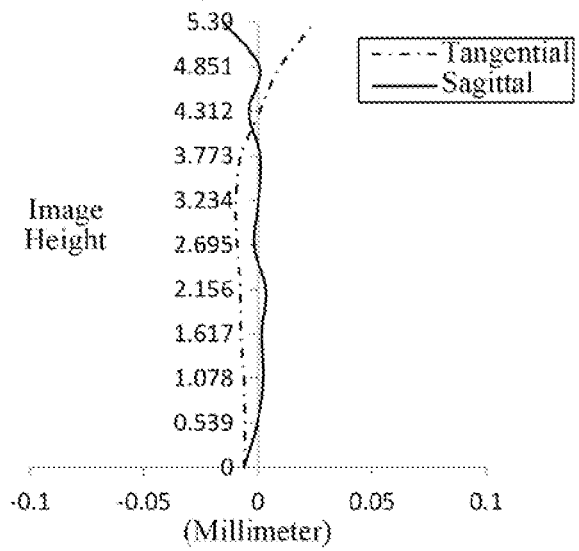
Figure 8C:
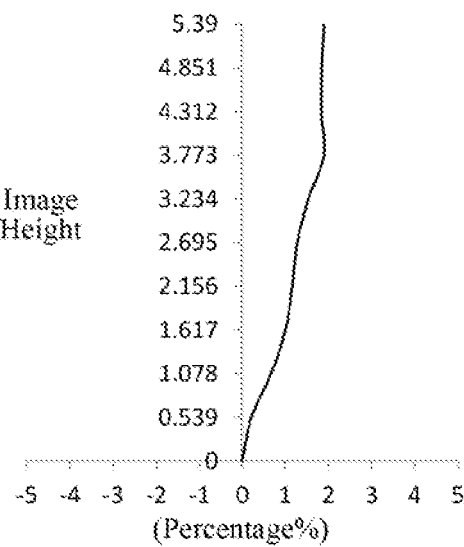

FIG. 8A illustrates longitudinal aberration curves of the optical imaging lens assembly according to example 4, representing the difference in the position of the image formed by light of different wavelengths passing through the lens assembly. FIG. 8B illustrates astigmatic curves of the optical imaging lens assembly according to example 4, representing the curvatures of a tangential plane and the curvatures of a sagittal plane. FIG. 8C illustrates a distortion curve of the optical imaging lens assembly according to example 4, representing the amounts of distortion corresponding to different image heights. It can be seen from FIG. 8A to FIG. 8C that the optical imaging lens assembly provided in example 4 may achieve good image quality.

Example 5

Figure 9:
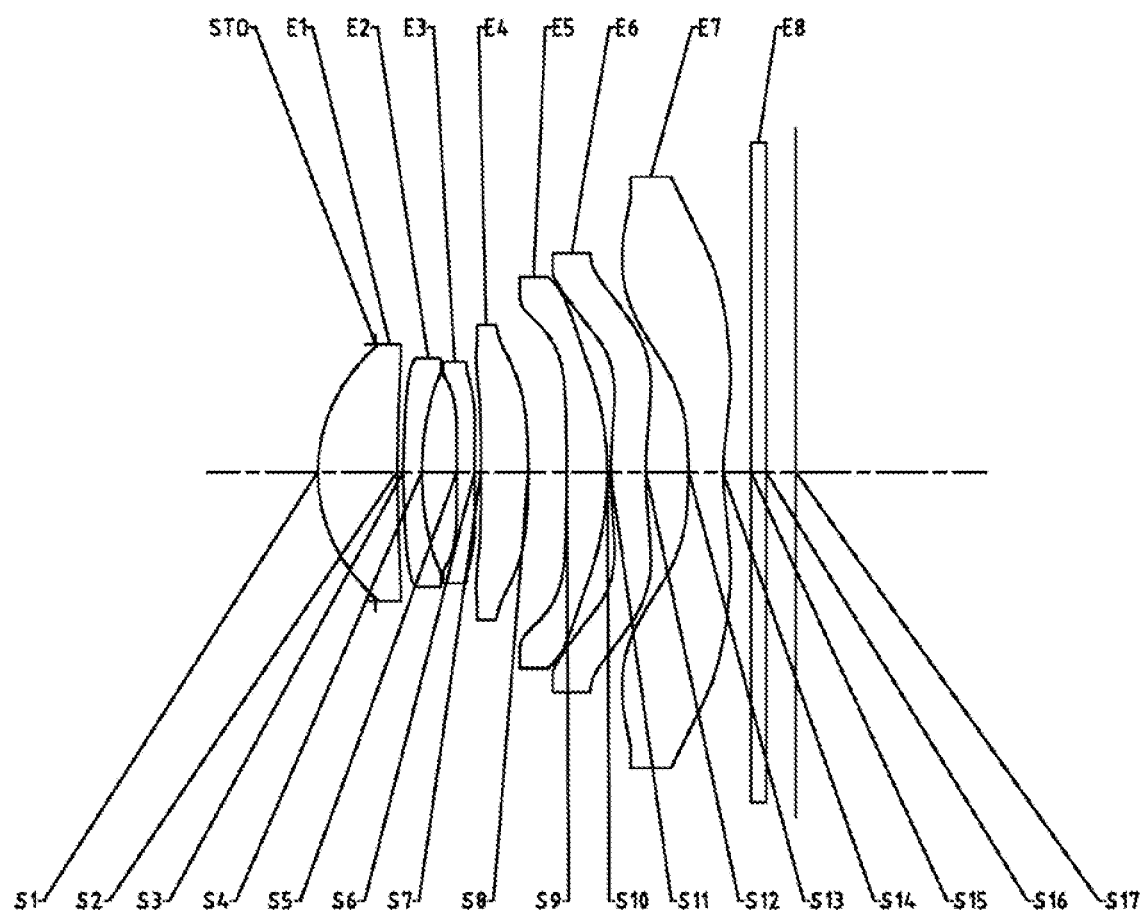
FIG. 9 illustrates a schematic structural view of an optical imaging lens assembly according to example 5 of the present disclosure.

An optical imaging lens assembly according to example 5 of the present disclosure is described below with reference to FIG. 9 to FIG. 10C. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has positive refractive power, an object-side surface S9 thereof is concave, and an image-side surface S10 thereof is convex. The sixth lens E6 has positive refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.85 mm, a distance TTL along the optical axis from the object-side surface S1 of the first lens E1 to the imaging plane S17 satisfies TTL=8.46 mm, half of a diagonal length ImgH of an effective pixel area on the imaging plane S17 satisfies ImgH-6.02 mm, half of a maximum field-of-view Semi-FOV of the optical imaging lens assembly satisfies Semi-FOV=40.8°, and a relative F number Fno of the optical imaging lens assembly satisfies Fno=1.53.

Table 9 is a table illustrating basic parameters of the optical imaging lens assembly of example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −1.0199 | | | | |
| S1 | Aspheric | 2.8999 | 1.4016 | 1.55 | 55.8 | 6.32 | −0.0700 |
| S2 | Aspheric | 15.0393 | 0.1068 | | | | −21.5772 |
| S3 | Aspheric | 9.4315 | 0.3300 | 1.67 | 20.4 | −15.68 | −19.2908 |
| S4 | Aspheric | 4.8913 | 0.6160 | | | | −2.7850 |
| S5 | Aspheric | 23.7220 | 0.3158 | 1.67 | 20.4 | −40.21 | 90.6654 |
| S6 | Aspheric | 12.5248 | 0.1088 | | | | −79.5426 |
| S7 | Aspheric | 23.9836 | 0.8371 | 1.55 | 55.8 | 19.56 | −65.3157 |
| S8 | Aspheric | −19.0346 | 0.6794 | | | | −93.3891 |
| S9 | Aspheric | −40.8235 | 0.7327 | 1.55 | 55.8 | 10.32 | −99.0000 |
| S10 | Aspheric | −4.9851 | 0.0505 | | | | −8.1386 |
| S11 | Aspheric | 7.4622 | 0.6280 | 1.62 | 25.9 | 97.20 | −19.7405 |
| S12 | Aspheric | 8.2420 | 0.7546 | | | | −91.5477 |
| S13 | Aspheric | −10.7362 | 0.6096 | 1.54 | 55.8 | −5.41 | 1.8276 |
| S14 | Aspheric | 4.0584 | 0.4941 | | | | −0.7734 |
| S15 | Spherical | Infinite | 0.2652 | 1.52 | 64.2 | | |
| S16 | Spherical | Infinite | 0.5258 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 1.7218E−02 | −1.7432E−03 | −2.9559E−03 | −1.1963E−03 | −4.6063E−04 | −7.5650E−05 | −2.4980E−05 | 1.8696E−05 | 2.6872E−06 |
| S2 | −7.4796E−02 | 1.9640E−02 | −8.3352E−03 | 2.7795E−03 | −6.4228E−04 | 2.1590E−04 | −3.2924E−05 | 4.6442E−06 | 4.4526E−06 |
| S3 | −4.4097E−02 | 4.5606E−02 | −6.1594E−03 | 4.8373E−03 | −4.2102E−04 | 3.3019E−04 | 2.4941E−05 | 1.0061E−05 | 2.2276E−05 |
| S4 | 5.0896E−03 | 1.6239E−02 | −3.1037E−03 | 1.0459E−03 | −1.2146E−04 | 2.4940E−05 | 1.1660E−05 | −9.6464E−06 | 3.5919E−06 |
| S5 | −2.5289E−01 | −8.2795E−03 | −1.5511E−03 | 1.1529E−03 | 1.1610E−04 | 1.5852E−06 | −2.8262E−05 | −7.8696E−06 | 8.7446E−07 |
| S6 | −3.0321E−01 | 3.3665E−02 | 5.4131E−03 | 5.4883E−03 | −1.4303E−04 | −4.2815E−04 | −2.0765E−05 | 6.7342E−05 | 2.4759E−05 |
| S7 | −2.3127E−01 | 7.4239E−02 | −5.0496E−03 | 2.3295E−03 | −2.7456E−03 | −6.9913E−05 | 6.8453E−04 | −4.5015E−05 | −1.4501E−04 |
| S8 | −5.0995E−01 | 6.7546E−02 | 2.3505E−02 | 8.4943E−03 | −5.4193E−04 | −2.3977E−03 | −8.1946E−04 | −3.8252E−05 | 3.1320E−05 |
| S9 | −6.7948E−01 | −1.0663E−01 | 5.0967E−02 | 2.5332E−02 | 1.2088E−02 | −5.6532E−04 | −2.1727E−03 | −7.1391E−04 | −2.1593E−04 |
| S10 | −1.8956E−01 | 3.6982E−02 | −2.9590E−02 | −2.7637E−02 | 8.7560E−03 | −2.3773E−03 | 6.4575E−04 | −8.8223E−04 | 8.8953E−04 |
| S11 | −1.6639E+00 | 1.8674E−01 | 8.9497E−02 | −3.4124E−02 | −1.0185E−03 | −2.9849E−03 | 6.6817E−03 | −1.4831E−03 | −5.1080E−04 |
| S12 | −1.5796E+00 | 1.8686E−01 | 1.2576E−01 | −4.8208E−02 | −1.7694E−02 | −7.2627E−03 | 5.5154E−03 | −2.9341E−03 | 5.7910E−04 |
| S13 | −2.6073E−01 | 8.7766E−01 | −4.6274E−01 | 1.6765E−01 | −3.5922E−02 | −6.5324E−03 | 7.3893E−03 | −2.9036E−03 | 4.3444E−04 |
| S14 | −5.3940E+00 | 1.0701E+00 | −3.1795E−01 | 1.5020E−01 | −7.4173E−02 | 9.1970E−03 | −3.9721E−03 | 2.4354E−03 | −1.1063E−03 |

Figure 10A:
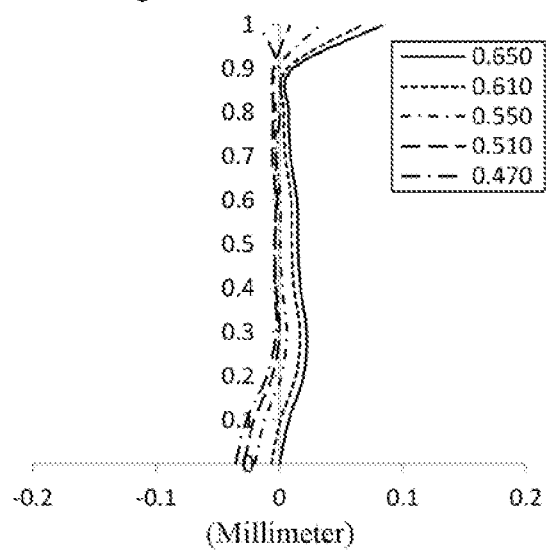
FIGS. 10A to 10C illustrate longitudinal aberration curves, astigmatic curves, and a distortion curve of the optical imaging lens assembly of the example 5, respectively.
Figure 10B:
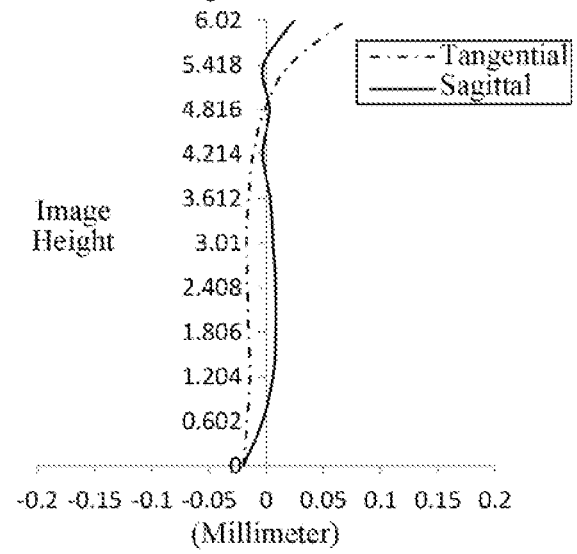
Figure 10C:
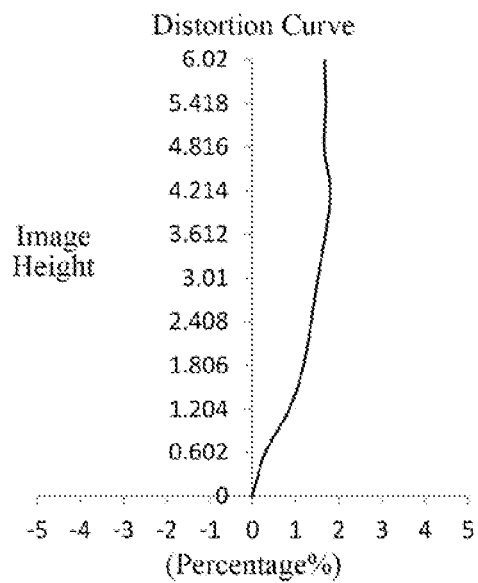

FIG. 10A illustrates longitudinal aberration curves of the optical imaging lens assembly according to example 5, representing the difference in the position of the image formed by light of different wavelengths passing through the lens assembly. FIG. 10B illustrates astigmatic curves of the optical imaging lens assembly according to example 5, representing the curvatures of a tangential plane and the curvatures of a sagittal plane. FIG. 10C illustrates a distortion curve of the optical imaging lens assembly according to example 5, representing the amounts of distortion corresponding to different image heights. It can be seen from FIG. 10A to FIG. 10C that the optical imaging lens assembly provided in example 5 may achieve good image quality.

Example 6

Figure 11:
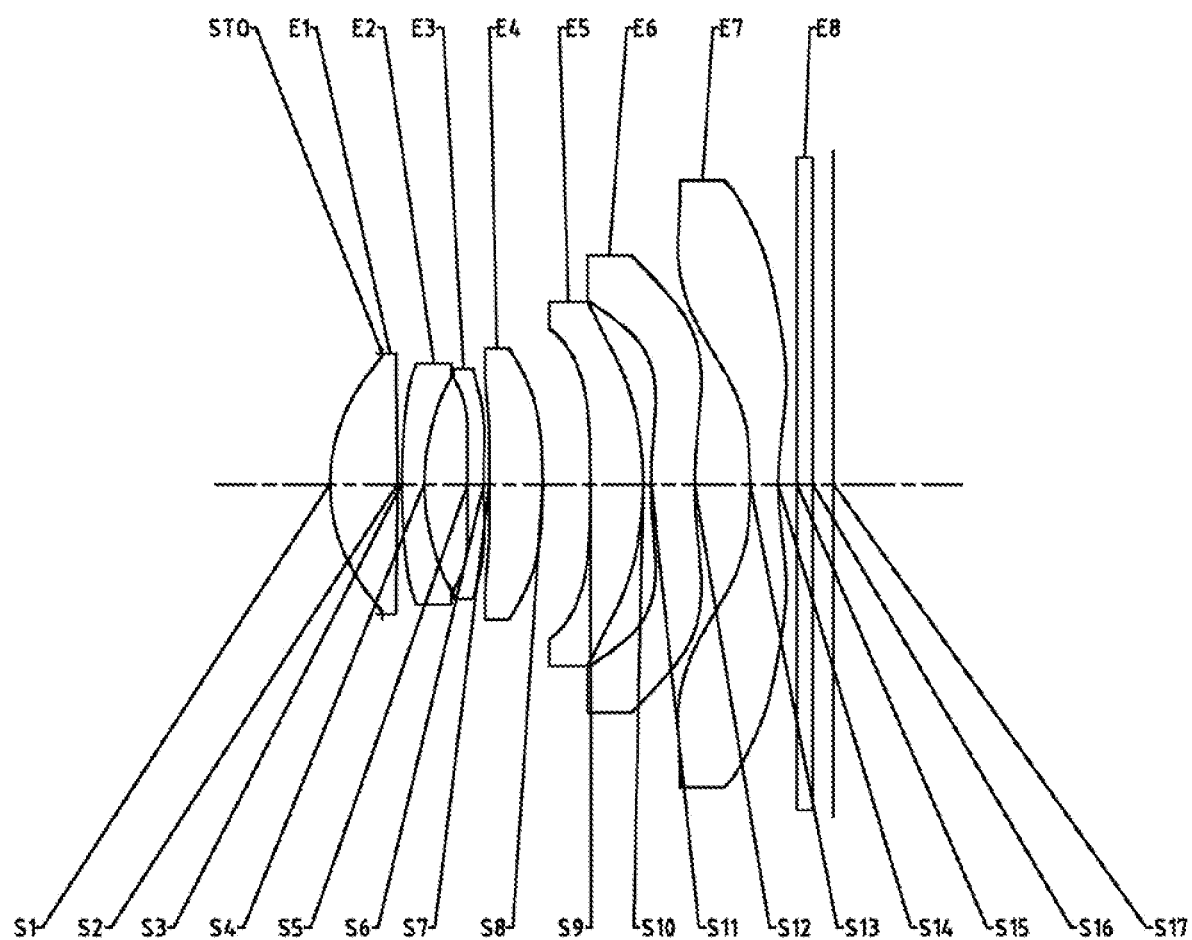
FIG. 11 illustrates a schematic structural view of an optical imaging lens assembly according to example 6 of the present disclosure.

An optical imaging lens assembly according to example 6 of the present disclosure is described below with reference to FIG. 11 to FIG. 12C. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is convex. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has positive refractive power, an object-side surface S9 thereof is concave, and an image-side surface S10 thereof is convex. The sixth lens E6 has negative refractive power, an object-side surface S1/ thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane $17.

In this example, a total effective focal length f of the optical imaging lens assembly satisfies f=6.80 mm, a distance TTL along the optical axis from the object-side surface S1 of the first lens E1 to the imaging plane S17 satisfies TTL-8.52 mm, half of a diagonal length ImgH of an effective pixel area on the imaging plane S17 satisfies ImgH=5.64 mm, half of a maximum field-of-view Semi-FOV of the optical imaging lens assembly satisfies Semi-FOV=39.0°, and a relative F number Fno of the optical imaging lens assembly satisfies Fno=1.55.

Table 11 is a table illustrating basic parameters of the optical imaging lens assembly of example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

Figure 12A:
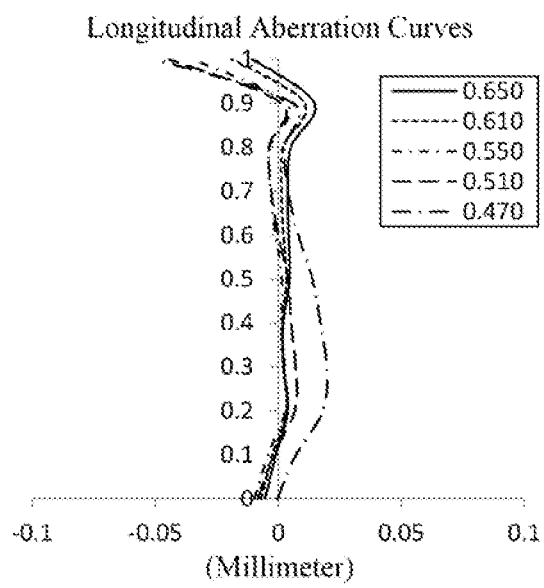
FIGS. 12A to 12C illustrate longitudinal aberration curves, astigmatic curves, and a distortion curve of the optical imaging lens assembly of the example 6, respectively.
Figure 12B:
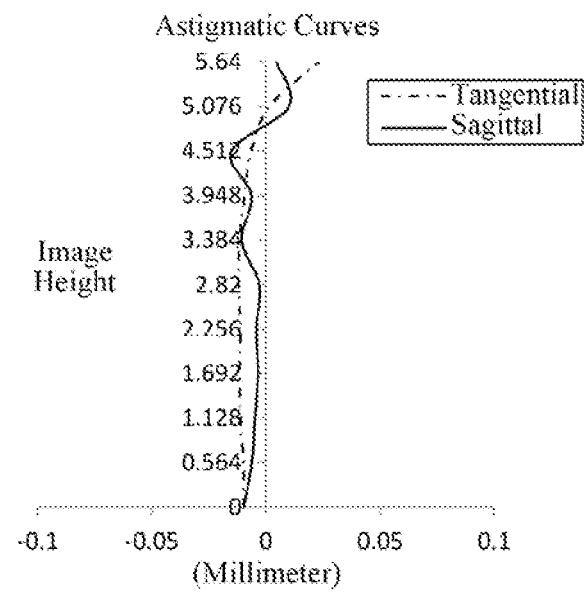
Figure 12C:
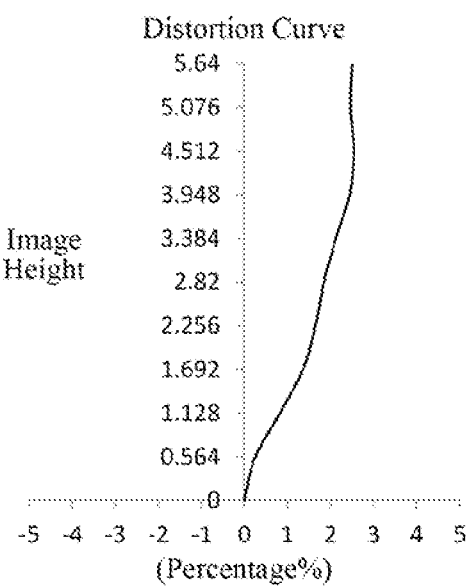

FIG. 12A illustrates longitudinal aberration curves of the optical imaging lens assembly according to example 6, representing the difference in the position of the image formed by light of different wavelengths passing through the lens assembly. FIG. 12B illustrates astigmatic curves of the optical imaging lens assembly according to example 6, representing the curvatures of a tangential plane and the curvatures of a sagittal plane. FIG. 12C illustrates a distortion curve of the optical imaging lens assembly according to example 6, representing the amounts of distortion corresponding to different image heights. It can be seen from FIG. 12A to FIG. 12C that the optical imaging lens assembly provided in example 6 may achieve good image quality.

Example 7

Figure 13:
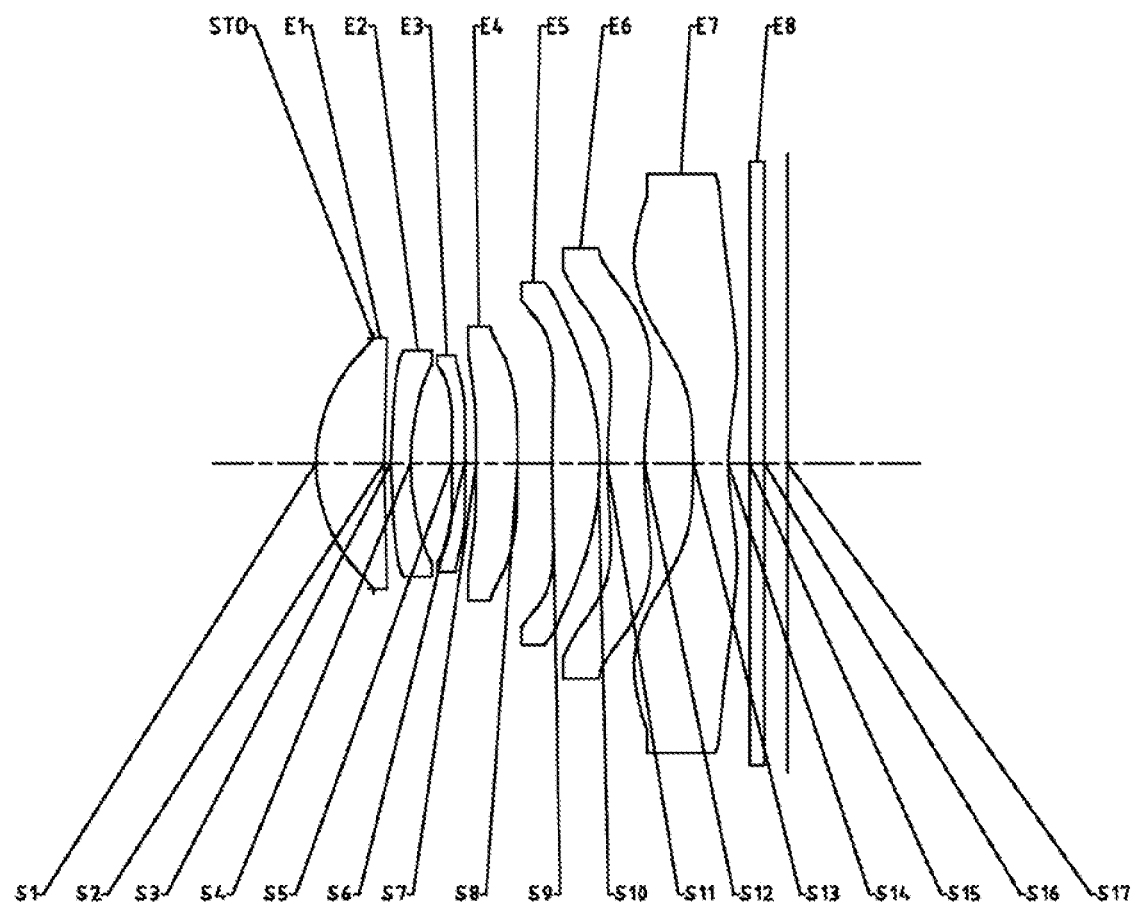
FIG. 13 illustrates a schematic structural view of an optical imaging lens assembly according to example 7 of the present disclosure.

An optical imaging lens assembly according to example 7 of the present disclosure is described below with reference to FIG. 13 to FIG. 14C. FIG. 13 shows a schematic structural view of the optical imaging lens assembly according to example 7 of the present disclosure.

As shown in FIG. 13, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −0.8811 | | | | |
| S1 | Aspheric | 3.0405 | 1.1461 | 1.55 | 55.8 | 5.56 | −0.1194 |
| S2 | Aspheric | −9999.0000 | 0.0671 | | | | −99.0000 |
| S3 | Aspheric | 7.5090 | 0.3789 | 1.67 | 20.4 | −10.27 | −15.3698 |
| S4 | Aspheric | 3.5112 | 0.7377 | | | | −3.1587 |
| S5 | Aspheric | 21.1245 | 0.2734 | 1.67 | 20.4 | −52.45 | 99.0000 |
| S6 | Aspheric | 13.1064 | 0.0946 | | | | −97.4838 |
| S7 | Aspheric | 29.1842 | 0.9000 | 1.55 | 55.8 | 14.52 | 20.0304 |
| S8 | Aspheric | −10.7769 | 0.8062 | | | | −59.2557 |
| S9 | Aspheric | −26.7775 | 0.9000 | 1.55 | 55.8 | 12.34 | 99.0000 |
| S10 | Aspheric | −5.4492 | 0.1341 | | | | −4.7675 |
| S11 | Aspheric | 9.7184 | 0.7335 | 1.62 | 25.9 | −88.12 | −18.6451 |
| S12 | Aspheric | 8.0128 | 0.9417 | | | | −41.5286 |
| S13 | Aspheric | −10.5621 | 0.4674 | 1.54 | 55.8 | −5.56 | 1.7084 |
| S14 | Aspheric | 4.2222 | 0.3212 | | | | −0.6391 |
| S15 | Spherical | Infinite | 0.2652 | 1.52 | 64.2 | | |
| S16 | Spherical | Infinite | 0.3529 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 1.0570E−02 | −8.2414E−03 | 4.6888E−03 | −1.7645E−03 | −5.8107E−04 | −1.5082E−04 | −5.3504E−05 | −6.4798E−06 | −1.0298E−05 |
| S2 | −1.7363E−02 | 7.0156E−03 | −1.3343E−02 | 3.4958E−03 | −2.5482E−03 | 7.6227E−04 | −4.8219E−04 | 1.3162E−04 | −7.8911E−05 |
| S3 | −4.1741E−02 | 4.1177E−02 | −8.8223E−03 | 4.9130E−03 | −1.4635E−03 | 6.2319E−04 | −2.1015E−04 | 6.7637E−05 | −1.1806E−05 |
| S4 | 3.3034E−03 | 1.7969E−02 | −2.7828E−03 | 1.0099E−03 | −2.3058E−04 | 6.7831E−05 | −1.2551E−05 | 6.5884E−07 | −7.4022E−07 |
| S5 | −2.4222E−01 | −6.7868E−03 | −1.6333E−03 | 9.4704E−04 | 2.2579E−05 | −1.2856E−05 | 1.0652E−06 | −1.2776E−05 | 3.7134E−06 |
| S6 | −3.1212E−01 | 3.0058E−02 | 3.5611E−03 | 3.5906E−03 | −2.4148E−03 | −1.2528E−04 | 7.9264E−05 | −1.2918E−05 | 2.3414E−05 |
| S7 | −2.2113E−01 | 7.5749E−02 | −3.8383E−03 | 1.3677E−03 | −5.7915E−04 | 1.2491E−04 | 6.9886E−05 | −1.3767E−04 | 3.8559E−05 |
| S8 | −5.3096E−01 | 6.4675E−02 | 2.5483E−02 | 1.5683E−02 | 5.9940E−03 | 1.1844E−03 | −2.3086E−04 | −2.7705E−04 | −1.2023E−04 |
| S9 | −8.6835E−01 | −6.9206E−02 | 1.5951E−02 | 2.0802E−02 | 2.1541E−02 | 4.9156E−03 | −3.4910E−03 | −2.9670E−03 | −1.0656E−03 |
| S10 | −3.3833E−01 | 5.0371E−02 | −8.3632E−03 | −3.7381E−02 | 2.8109E−02 | −3.3481E−03 | −1.3021E−03 | −2.9799E−03 | −4.4005E−04 |
| S11 | −2.0902E+00 | −6.7161E−02 | 1.0248E−01 | −3.2682E−03 | −3.5039E−03 | −6.9700E−03 | 1.0322E−02 | 3.6926E−03 | 1.3684E−03 |
| S12 | −1.7864E+00 | 5.7145E−02 | 1.1016E−01 | −3.1617E−02 | 1.2036E−02 | −3.7358E−03 | 8.9436E−03 | −3.0667E−04 | 1.1960E−03 |
| S13 | −2.8397E−01 | 8.3745E−01 | 4.4453E−01 | 1.6617E−01 | −4.8605E−02 | 5.1850E−03 | 7.5126E−03 | −5.2978E−03 | 1.3707E−03 |
| S14 | −6.2181E+00 | 1.0061E+00 | 4.7687E−01 | 1.2968E−01 | −9.2022E−02 | 5.2852E−03 | 5.3366E−03 | 8.9983E−03 | 3.9629E−04 | surface S5 thereof is convex, and an image-side surface S6 thereof is concave. The fourth lens E4 has negative refractive power, an object-side surface S7 thereof is concave, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.78 mm, a distance TTL along the optical axis from the object-side surface S1 of the first lens E1 to the imaging plane S17 satisfies TTL=8.47 mm, half of a diagonal length ImgH of an effective pixel area on the imaging plane S17 satisfies ImgH=5.50 mm, half of a maximum field-of-view Semi-FOV of the optical imaging lens assembly satisfies Semi-FOV=38.5°, and a relative F number Fno of the optical imaging lens assembly satisfies Fno=1.53.

Table 13 is a table illustrating basic parameters of the optical imaging lens assembly of example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −1.0251 | | | | |
| S1 | Aspheric | 2.9074 | 1.2174 | 1.55 | 55.8 | 6.25 | −0.0559 |
| S2 | Aspheric | 16.7531 | 0.1241 | | | | −17.8589 |
| S3 | Aspheric | 7.5992 | 0.3543 | 1.67 | 20.4 | −14.87 | −23.3616 |
| S4 | Aspheric | 4.2240 | 0.7383 | | | | −3.3026 |
| S5 | Aspheric | 22.2155 | 0.2366 | 1.67 | 20.4 | −386.37 | 92.4978 |
| S6 | Aspheric | 20.3663 | 0.2015 | | | | −10.8509 |
| S7 | Aspheric | −5608.8977 | 0.7415 | 1.55 | 55.8 | −1562.11 | 99.0000 |
| S8 | Aspheric | 1006.4255 | 0.6142 | | | | −99.0000 |
| S9 | Aspheric | 16.9380 | 0.8732 | 1.55 | 55.8 | 7.18 | −98.0110 |
| S10 | Aspheric | −5.0138 | 0.1341 | | | | −7.1063 |
| S11 | Aspheric | 9.8409 | 0.6612 | 1.62 | 25.9 | −61.85 | −5.5700 |
| S12 | Aspheric | 7.6303 | 0.8901 | | | | −49.4109 |
| S13 | Aspheric | −12.8721 | 0.6168 | 1.54 | 55.8 | −5.59 | 2.1479 |
| S14 | Aspheric | 3.9825 | 0.3836 | | | | −0.7066 |
| S15 | Spherical | Infinite | 0.2652 | 1.52 | 64.2 | | |
| S16 | Spherical | Infinite | 0.4159 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | 2.3334E−02 | −3.3602E−03 | −4.0668E−03 | −2.0238E−03 | −7.9331E−04 | −2.6481E−04 | −6.8202E−05 | −8.4871E−06 | 4.3938E−06 |
| S2 | −7.3747E−02 | 1.8168E−02 | −9.3193E−03 | 2.0480E−03 | −7.6484E−04 | 1.9068E−04 | −5.1804E−05 | 1.2077E−05 | 1.8252E−06 |
| S3 | −4.8918E−02 | 4.2927E−02 | −7.0118E−03 | 3.8996E−03 | 4.7808E−04 | 2.4902E−04 | −9.1042E−06 | 3.7884E−06 | 4.2837E−06 |
| S4 | 2.3223E−03 | 1.7672E−02 | −2.6990E−03 | 8.2226E−04 | −1.0182E−04 | 1.5433E−05 | 3.3060E−06 | −5.5613E−06 | 3.9273E−07 |
| S5 | −2.5173E−01 | −8.9616E−03 | −1.2494E−03 | 1.1355E−03 | 1.7916E−05 | 3.0360E−05 | −3.7249E−05 | 2.8622E−06 | −2.4454E−06 |
| S6 | −2.9717E−01 | 3.0196E−02 | 7.3247E−03 | 5.5435E−03 | −7.2694E−05 | −1.0375E−04 | −2.8468E−05 | 7.3217E−05 | 1.6690E−05 |
| S7 | −2.1102E−01 | 7.0157E−02 | −5.1314E−03 | 3.7652E−03 | −2.6465E−03 | −6.3606E−04 | 1.0835E−04 | 3.2067E−05 | −7.0472E−05 |
| S8 | −5.8878E−01 | 6.8263E−02 | 1.4539E−02 | 1.1686E−02 | 1.0929E−03 | −1.2915E−03 | −1.1965E−03 | −4.3300E−04 | −1.4703E−04 |
| S9 | −7.3002E−01 | −7.7759E−02 | 3.6624E−02 | 2.5373E−02 | 7.8442E−03 | −3.0705E−04 | −2.3051E−03 | −9.0285E−04 | −3.8499E−04 |
| S10 | −3.0612E−01 | 1.1665E−02 | −1.9291E−02 | −2.5803E−02 | 3.0508E−03 | 1.7898E−03 | 1.0016E−03 | −1.4634E−03 | −4.2576E−04 |
| S11 | −1.5750E+00 | 1.7545E−01 | 7.9327E−02 | −3.0278E−02 | 4.6882E−04 | −3.9746E−03 | 5.0433E−03 | −1.3907E−03 | −7.9126E−04 |
| S12 | −1.5152E+00 | 1.5618E−01 | 1.3892E−01 | −3.6493E−02 | 1.7483E−02 | −9.6317E−03 | 3.4169E−03 | −3.0344E−03 | 3.6696E−04 |
| S13 | −2.7541E−01 | 8.7788E−01 | −4.6332E−01 | 1.6534E−01 | −3.3776E−02 | −9.1438E−03 | 9.5056E−03 | −4.8649E−03 | 4.9271E−04 |
| S14 | −5.0434E+00 | 1.1097E+00 | −4.1341E−01 | 1.2667E−01 | −5.1133E−02 | 4.4244E−03 | 1.3695E−03 | −6.4173E−04 | −1.5063E−03 |

Figure 14A:
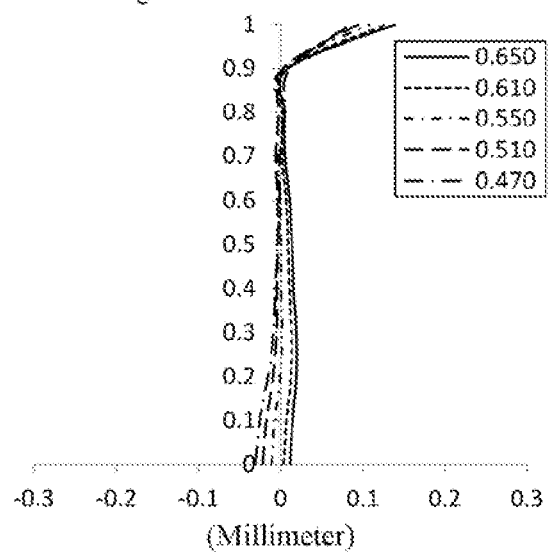
FIGS. 14A to 14C illustrate longitudinal aberration curves, astigmatic curves, and a distortion curve of the optical imaging lens assembly of the example 7, respectively.
Figure 14B:
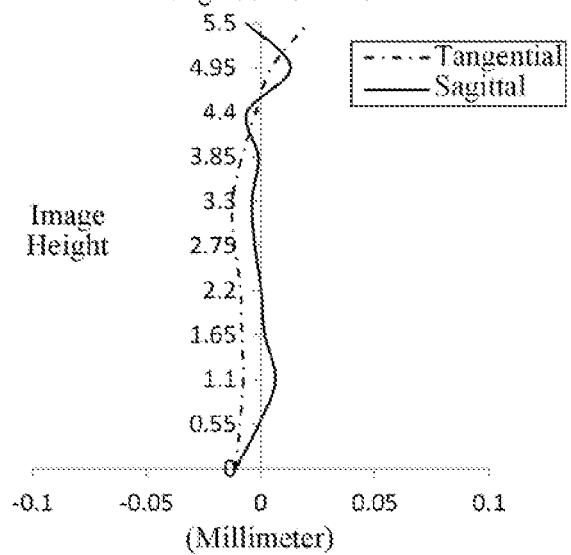
Figure 14C:
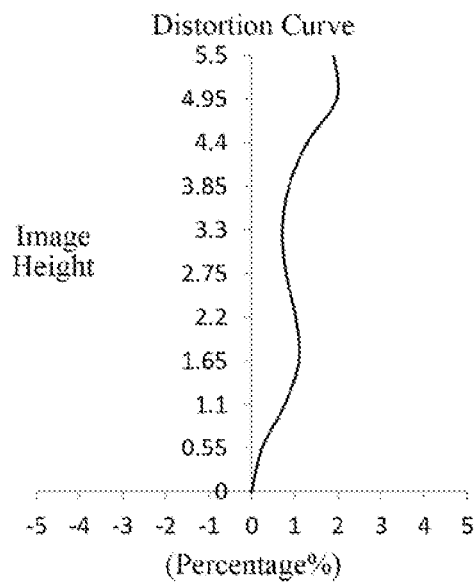

FIG. 14A illustrates longitudinal aberration curves of the optical imaging lens assembly according to example 7, representing the difference in the position of the image formed by light of different wavelengths passing through the lens assembly. FIG. 14B illustrates astigmatic curves of the optical imaging lens assembly according to example 7, representing the curvatures of a tangential plane and the curvatures of a sagittal plane. FIG. 14C illustrates a distortion curve of the optical imaging lens assembly according to example 7, representing the amounts of distortion corresponding to different image heights. It can be seen from FIG. 14A to FIG. 14C that the optical imaging lens assembly provided in example 7 may achieve good image quality.

Example 8

Figure 15:
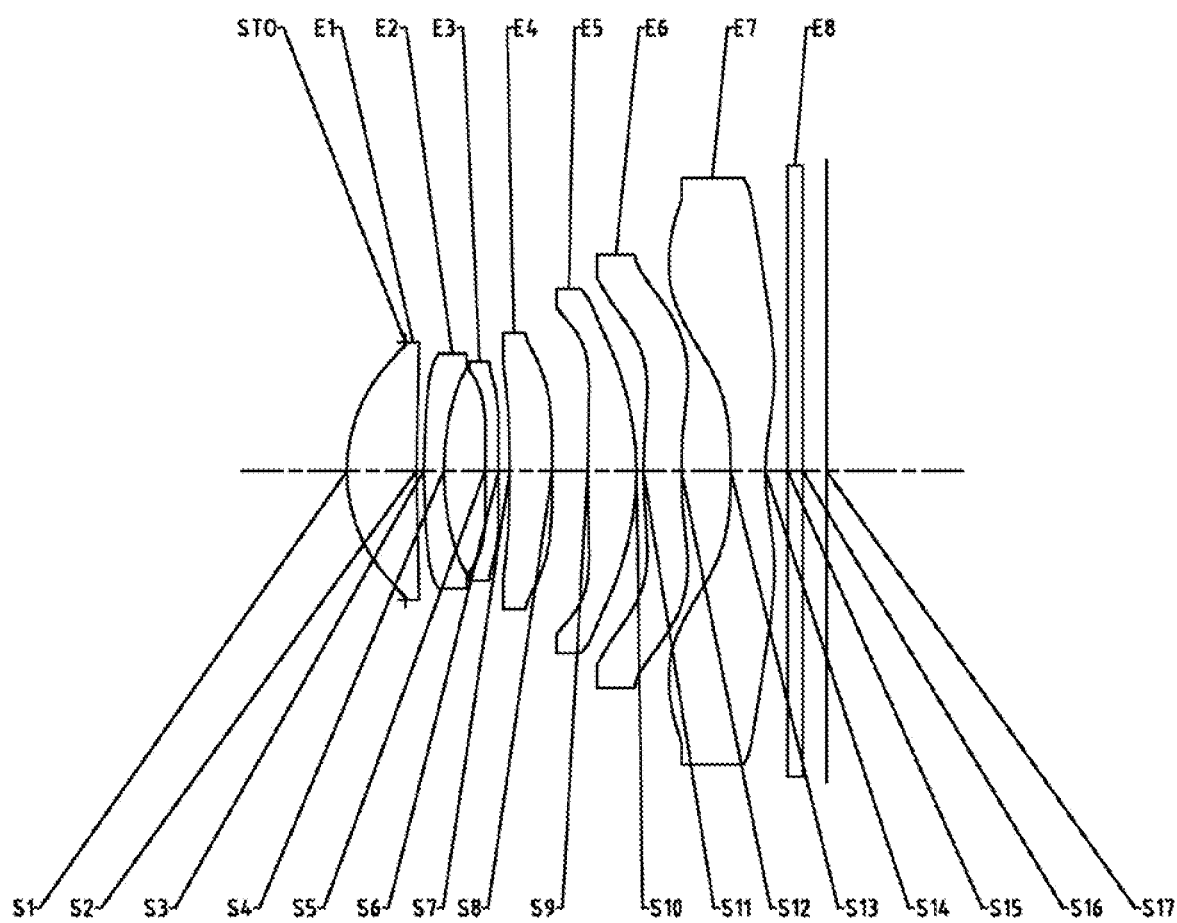
FIG. 15 illustrates a schematic structural view of an optical imaging lens assembly according to example 8 of the present disclosure.

An optical imaging lens assembly according to example 8 of the present disclosure is described below with reference to FIG. 15 to FIG. 16C. FIG. 15 shows a schematic structural view of the optical imaging lens assembly according to example 8 of the present disclosure.

As shown in FIG. 15, the optical imaging lens assembly includes a stop STO, a first lens E1, a second lens E2, a third lens E3, a fourth lens E4, a fifth lens E5, a sixth lens E6, a seventh lens E7, an optical filter E8 and an imaging plane S17, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has negative refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has positive refractive power, an object-side surface S9 thereof is convex, and an image-side surface S10 thereof is convex. The sixth lens E6 has negative refractive power, an object-side surface S11 thereof is convex, and an image-side surface S12 thereof is concave. The seventh lens E7 has negative refractive power, an object-side surface S13 thereof is concave, and an image-side surface S14 thereof is concave. The optical filter E8 has an object-side surface S15 and an image-side surface S16. Light from an object sequentially passes through the respective surfaces S1 to S16 and is finally imaged on the imaging plane S17.

In this example, a total effective focal length f of the optical imaging lens assembly satisfies f=6.77 mm, a distance TTL along the optical axis from the object-side surface S1 of the first lens E1 to the imaging plane S17 satisfies TTL=8.45 mm, half of a diagonal length ImgH of an effective pixel area on the imaging plane S17 satisfies ImgH=5.50 mm, half of a maximum field-of-view Semi-FOV of the optical imaging lens assembly satisfies Semi-FOV=38.5°, and a relative F number Fno of the optical imaging lens assembly satisfies Fno=1.50.

Table 15 is a table illustrating basic parameters of the optical imaging lens assembly of example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Aspheric | Infinite | −1.0272 | | | | |
| S1 | Aspheric | 2.9072 | 1.2250 | 1.55 | 55.8 | 6.25 | −0.0576 |
| S2 | Aspheric | 16.6089 | 0.1234 | | | | −17.9585 |
| S3 | Aspheric | 7.7280 | 0.3515 | 1.67 | 20.4 | −14.94 | −23.2240 |
| S4 | Aspheric | 4.2748 | 0.7297 | | | | −3.2507 |
| S5 | Aspheric | 22.3481 | 0.2403 | 1.67 | 20.4 | −181.26 | 93.0564 |
| S6 | Aspheric | 18.7824 | 0.1910 | | | | −15.8484 |
| S7 | Aspheric | 79.5675 | 0.7519 | 1.55 | 55.8 | 186.82 | −41.6668 |
| S8 | Aspheric | 360.0000 | 0.6208 | | | | −99.0000 |
| S9 | Aspheric | 18.7771 | 0.8701 | 1.55 | 55.8 | 7.26 | −99.0000 |
| S10 | Aspheric | −4.9473 | 0.1266 | | | | −7.3173 |
| S11 | Aspheric | 9.9423 | 0.6612 | 1.62 | 25.9 | −63.49 | −6.7008 |
| S12 | Aspheric | 7.7360 | 0.8758 | | | | −50.5915 |
| S13 | Aspheric | −12.4940 | 0.6082 | 1.54 | 55.8 | −5.53 | 2.0755 |
| S14 | Aspheric | 3.9638 | 0.3900 | | | | −0.7304 |
| S15 | Spherical | Infinite | 0.2652 | 1.52 | 64.2 | | |
| S16 | Spherical | Infinite | 0.4224 | | | | |
| S17 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 2.3048E−02 | −3.2257E−03 | −4.0206E−03 | −1.9943E−03 | −7.8770E−04 | −2.6274E−04 | −7.1677E−05 | −9.7297E−06 | 4.1715E−06 |
| S2 | −7.3815E−02 | 1.8059E−02 | −9.3687E−03 | 2.0463E−03 | −7.6948E−04 | 1.9492E−04 | −4.8863E−05 | 1.1669E−05 | 4.1701E−06 |
| S3 | −4.8635E−02 | 4.3008E−02 | −7.0600E−03 | 3.9235E−03 | −4.8779E−04 | 2.5914E−04 | −5.3232E−06 | 5.2823E−06 | 4.0787E−07 |
| S4 | 2.6952E−03 | 1.7585E−02 | −2.6743E−03 | 8.4122E−04 | −9.4957E−05 | 2.1830E−05 | 1.0381E−05 | −4.6722E−06 | −6.7090E−07 |

TABLE 16-continued

| Surface number | A4 | A6 | A8 | A10 | A12 | A14 | A16 | A18 | A20 |
|---|---|---|---|---|---|---|---|---|---|
| S5 | −2.5162E−01 | −8.9367E−03 | −1.2057E−03 | 1.1699E−03 | 2.4644E−05 | 3.5620E−05 | −3.6587E−05 | 4.4801E−06 | −1.1831E−06 |
| S6 | −2.9780E−01 | 3.0312E−02 | 7.1342E−03 | 5.5258E−03 | −3.5259E−05 | −6.3142E−05 | −1.2110E−05 | 6.7889E−05 | 1.8092E−05 |
| S7 | −2.1273E−01 | 7.0168E−02 | −5.2539E−03 | 3.9711E−03 | −2.3171E−03 | −5.6397E−04 | 4.6970E−05 | −2.4980E−07 | −6.1131E−05 |
| S8 | −5.8603E−01 | 6.8249E−02 | 1.5215E−02 | 1.1331E−02 | 1.2560E−03 | −1.2399E−03 | −1.2378E−03 | −4.8848E−04 | −1.7274E−04 |
| S9 | −7.3667E−01 | −8.0265E−02 | 3.7049E−02 | 2.5328E−02 | 7.7842E−03 | −2.6829E−04 | −2.3025E−03 | −9.4564E−04 | −3.9908E−04 |
| S10 | −2.8989E−01 | 1.2012E−02 | −2.0023E−02 | −2.5398E−02 | 2.9290E−03 | 2.0400E−03 | 1.1549E−03 | −1.6271E−03 | −3.2238E−04 |
| S11 | −1.5840E+00 | 1.7650E−01 | 7.9996E−02 | −3.0808E−02 | −6.3495E−04 | −4.2794E−03 | 4.8786E−03 | −1.6421E−03 | −5.3880E−04 |
| S12 | −1.5099E+00 | 1.5965E−01 | 1.3817E−01 | −3.6503E−02 | 1.8375E−02 | −1.0166E−02 | 3.1966E−03 | −2.9495E−03 | 8.2858E−04 |
| S13 | −2.8721E−01 | 8.8275E−01 | −4.6191E−01 | 1.6622E−01 | −3.3397E−02 | −8.2656E−03 | 9.0406E−03 | −5.4257E−03 | 9.3295E−04 |
| S14 | −5.1300E+00 | 1.1021E+00 | −4.1087E−01 | 1.2967E−01 | −5.3569E−02 | 6.4298E−03 | 1.8514E−03 | −1.1049E−03 | −2.2210E−03 |

Figure 16A:
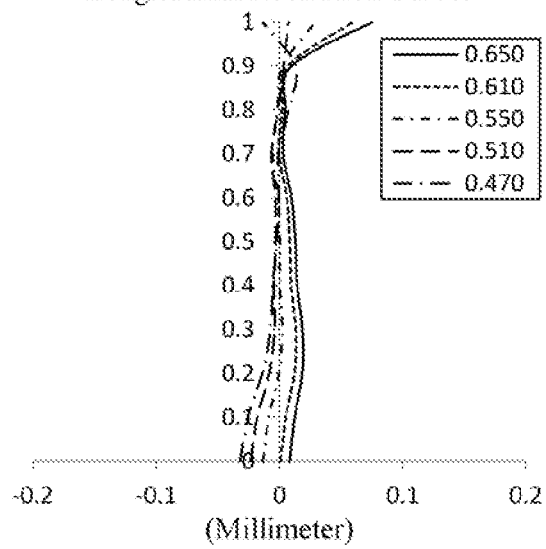
FIGS. 16A to 16C illustrate longitudinal aberration curves, astigmatic curves, and a distortion curve of the optical imaging lens assembly of the example 8, respectively.
Figure 16B:
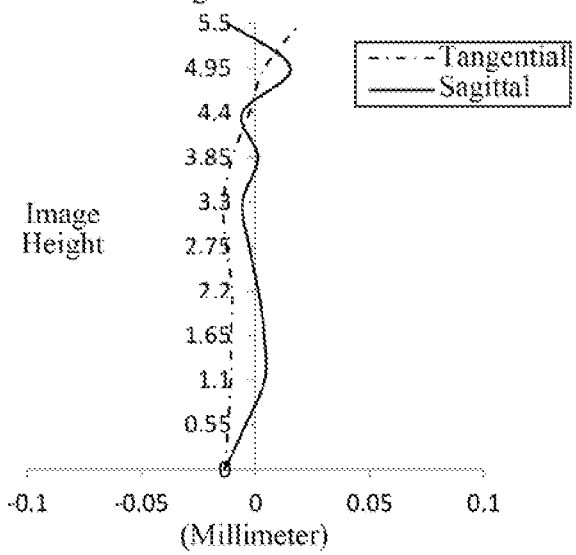
Figure 16C:
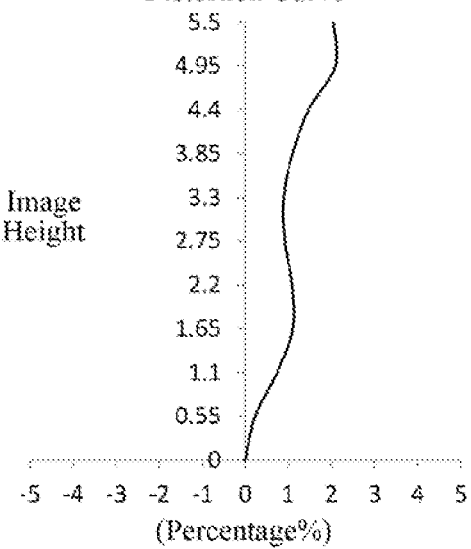

FIG. 16A illustrates longitudinal aberration curves of the optical imaging lens assembly according to example 8, representing the difference in the position of the image formed by the lens assembly for light of each wavelength. FIG. 16B illustrates astigmatic curves of the optical imaging lens assembly according to example 8, representing the curvatures of a tangential plane and the curvatures of a sagittal plane. FIG. 16C illustrates a distortion curve of the optical imaging lens assembly according to example 8, representing the amounts of distortion corresponding to different image heights. It can be seen from FIG. 16A to FIG. 16C that the optical imaging lens assembly provided in example 8 may achieve good image quality.

In view of the above, examples 1 to 8 respectively satisfy the relationship shown in Table 17.

TABLE 17

| Conditional/Example | 1 | 2 | 3 | 4 | 5 | 6 | 7 | 8 |
|---|---|---|---|---|---|---|---|---|
| f/f7 | −1.27 | −1.22 | −1.16 | −1.29 | −1.27 | −1.22 | −1.21 | −1.22 |
| f1/R1 | 3.32 | 2.15 | 2.16 | 2.21 | 2.18 | 1.83 | 2.15 | 2.15 |
| R3/R4 | 0.98 | 1.88 | 1.63 | 1.79 | 1.93 | 2.14 | 1.80 | 1.81 |
| R5/R6 | 3.10 | 1.09 | 2.61 | 1.97 | 1.89 | 1.61 | 1.09 | 1.19 |
| R11/R12 | 1.10 | 1.26 | 0.49 | 1.10 | 0.91 | 1.21 | 1.29 | 1.29 |
| R13/R14 | −2.09 | −3.03 | −2.67 | −2.65 | −2.65 | −2.50 | −3.23 | −3.15 |
| T45/T23 | 1.03 | 0.83 | 1.09 | 1.25 | 1.10 | 1.09 | 0.83 | 0.85 |
| CT1/CT2 | 3.09 | 3.65 | 2.85 | 3.74 | 4.25 | 3.02 | 3.44 | 3.49 |
| CT4/CT3 | 4.81 | 3.04 | 3.30 | 3.07 | 2.65 | 3.29 | 3.13 | 3.13 |
| ET7/CT7 | 3.10 | 1.96 | 1.95 | 1.84 | 1.21 | 1.43 | 2.03 | 1.85 |
| SAG71/SAG42 | 2.05 | 1.94 | 1.78 | 1.95 | 1.86 | 1.98 | 1.76 | 1.86 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, comprising: a first lens, a second lens, a third lens, a fourth lens, a fifth lens, a sixth lens and a seventh lens, which are sequentially arranged from an object side to an image side of the optical imaging lens assembly along an optical axis,
   each of the first lens to the seventh lens having refractive power;
   the first lens having positive refractive power; and
   the third lens having negative refractive power,
   wherein ImgH>5 mm, and
   Fno<1.6,
   where ImgH is half of a diagonal length of an effective pixel area on an imaging plane of the optical imaging lens assembly, and Fno is a relative F number of the optical imaging lens assembly.

2. The optical imaging lens assembly according to claim 1, wherein $-1.5 < f/f7 \leq -1.0$,
   where f is a total effective focal length of the optical imaging lens assembly, and f7 is an effective focal length of the seventh lens.

3. The optical imaging lens assembly according to claim 1, wherein $1.5 < f1/R1 < 3.5$,
   where f1 is an effective focal length of the first lens, and R1 is a radius of curvature of an object-side surface of the first lens.

4. The optical imaging lens assembly according to claim 1, wherein $0.5 < R3/R4 < 2.5$,
   where R3 is a radius of curvature of an object-side surface of the second lens, and R4 is a radius of curvature of an image-side surface of the second lens.

5. The optical imaging lens assembly according to claim 1, wherein $1.0 < R5/R6 < 3.5$,
   where R5 is a radius of curvature of an object-side surface of the third lens, and R6 is a radius of curvature of an image-side surface of the third lens.

6. The optical imaging lens assembly according to claim 1, wherein $0 < R11/R12 < 1.5$,
   where R11 is a radius of curvature of an object-side surface of the sixth lens, and R12 is a radius of curvature of an image-side surface of the sixth lens.

7. The optical imaging lens assembly according to claim 1, wherein $-3.5 < R13/R14 < -2.0$,
   where R13 is a radius of curvature of an object-side surface of the seventh lens, and R14 is a radius of curvature of an image-side surface of the seventh lens.

8. The optical imaging lens assembly according to claim 1, wherein $0.5 < T45/T23 < 1.5$,
   where T45 is a spaced interval between the fourth lens and the fifth lens along the optical axis, and T23 is a spaced interval between the second lens and the third lens along the optical axis.

9. The optical imaging lens assembly according to claim 1, wherein 2.5<CT1/CT2<4.5,
where CT1 is a center thickness of the first lens along the optical axis, and CT2 is a center thickness of the second lens along the optical axis.

10. The optical imaging lens assembly according to claim 1, wherein 2.5<CT4/CT3<5.0,
where CT4 is a center thickness of the fourth lens along the optical axis, and CT3 is a center thickness of the third lens along the optical axis.

11. The optical imaging lens assembly according to claim 1,
wherein 1.0<ET7/CT7<3.5,
where ET7 is an edge thickness of the seventh lens in a direction parallel to the optical axis, and CT7 is a center thickness of the seventh lens along the optical axis.

12. The optical imaging lens assembly according to claim 1, wherein 1.5<SAG71/SAG42<2.5,
where SAG71 is an on-axis distance from an intersection of an object-side surface of the seventh lens and the optical axis to a vertex of an effective radius of the object-side surface of the seventh lens, and SAG42 is an on-axis distance from an intersection of an image-side surface of the fourth lens and the optical axis to a vertex of an effective radius of the image-side surface of the fourth lens.

13. The optical imaging lens assembly according to claim 1, wherein n2>1.6, n3>1.6, and n6>1.6,
where n2 is a refractive index of the second lens, n3 is a refractive index of the third lens, and n6 is a refractive index of the sixth lens.

14. An optical imaging lens assembly, comprising: a first lens, a second lens, a third lens, a fourth lens, a fifth lens, a sixth lens and a seventh lens, which are sequentially arranged from an object side to an image side of the optical imaging lens assembly along an optical axis,
each of the first lens to the seventh lens having refractive power;
the first lens having positive refractive power;
the third lens having negative refractive power; and
the seventh lens having negative refractive power,
wherein ImgH>5 mm, and
−1.5<f/f7≤−1.0,
where ImgH is half of a diagonal length of an effective pixel area on an imaging plane of the optical imaging lens assembly, f is a total effective focal length of the optical imaging lens assembly, and f7 is an effective focal length of the seventh lens.

15. The optical imaging lens assembly according to claim 14, wherein 1.5<f1/R1<3.5,
where f1 is an effective focal length of the first lens, and R1 is a radius of curvature of an object-side surface of the first lens.

16. The optical imaging lens assembly according to claim 14, wherein 0.5<T45/T23<1.5,
where T45 is a spaced interval between the fourth lens and the fifth lens along the optical axis, and T23 is a spaced interval between the second lens and the third lens along the optical axis.

17. The optical imaging lens assembly according to claim 14, wherein 2.5<CT1/CT2<4.5,
where CT1 is a center thickness of the first lens along the optical axis, and CT2 is a center thickness of the second lens along the optical axis.

18. The optical imaging lens assembly according to claim 14, wherein 2.5<CT4/CT3<5.0,
where CT4 is a center thickness of the fourth lens along the optical axis, and CT3 is a center thickness of the third lens along the optical axis.

19. The optical imaging lens assembly according to claim 14,
wherein 1.0<ET7/CT7<3.5,
where ET7 is an edge thickness of the seventh lens in a direction parallel to the optical axis, and CT7 is a center thickness of the seventh lens along the optical axis.

20. The optical imaging lens assembly according to claim 14, wherein 1.5<SAG71/SAG42<2.5,
where SAG71 is an on-axis distance from an intersection of an object-side surface of the seventh lens and the optical axis to a vertex of an effective radius of the object-side surface of the seventh lens, and SAG42 is an on-axis distance from an intersection of an image-side surface of the fourth lens and the optical axis to a vertex of an effective radius of the image-side surface of the fourth lens.

* * * * *